US011304198B2

(12) United States Patent
Ng et al.

(10) Patent No.: US 11,304,198 B2
(45) Date of Patent: Apr. 12, 2022

(54) PACKET DATA CONVERGENCE PROTOCOL TRAFFIC MONITORING

(71) Applicant: QUALCOMM Incorporated, San Diego, CA (US)

(72) Inventors: Alvin Siu-Chung Ng, Hong Kong (HK); Long Duan, San Diego, CA (US); Ming Yang, San Diego, CA (US); Mukesh Kumar Mittal, San Diego, CA (US); Rajasekar Arulprakasam, San Diego, CA (US); Chun Chung Patrick Chan, Hong Kong (HK); Abhijeet Prasad, San Diego, CA (US); Neelakanta Venkata Seshachalam Chimmapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/997,519

(22) Filed: Aug. 19, 2020

(65) Prior Publication Data
US 2022/0061053 A1 Feb. 24, 2022

(51) Int. Cl.
*H04W 72/04* (2009.01)
(52) U.S. Cl.
CPC ........ *H04W 72/0486* (2013.01); *H04W 72/04* (2013.01)
(58) Field of Classification Search
CPC ......... H04W 72/8486; H04W 72/0044; H04W 72/10; H04W 72/04
USPC ......... 370/329, 310.2, 350; 455/550.1, 450.2
See application file for complete search history.

(56) References Cited

U.S. PATENT DOCUMENTS

| 9,131,390 | B2 * | 9/2015 | Kakadia | ................. H04L 41/083 |
| 11,039,341 | B2 * | 6/2021 | Tang | ................... H04L 65/1069 |
| 11,102,780 | B2 * | 8/2021 | Chu | ....................... H04L 5/0044 |

(Continued)

FOREIGN PATENT DOCUMENTS

| EP | 2854444 A1 | 4/2015 |
| WO | WO-2017062057 A1 | 4/2017 |
| WO | WO-2018172542 A1 | 9/2018 |

OTHER PUBLICATIONS

International Search Report and Written Opinion—PCT/US2021/044210—ISA/EPO—dated Nov. 22, 2021.

*Primary Examiner* — Danh C Le
(74) *Attorney, Agent, or Firm* — Qualcomm Incorporated

(57) ABSTRACT

Methods, systems, and devices for wireless communications are described Generally, the described techniques provide for dynamically adjusting PDCP data splitting based on traffic parameters. In some examples, a wireless device may allocate data between first and second radio access technologies. The wireless device may receive a first set of data traffic parameters from a medium access control layer at the wireless device, where the data traffic parameters are associated with the first radio access technology. The wireless device may receive a second set of data traffic parameters from a medium access control layer at a second wireless device, where the data traffic parameters are associated with the second radio access technology. The wireless device may adjust the data allocation to the first and second radio access technologies based on receiving the first and second sets of data traffic parameters.

30 Claims, 12 Drawing Sheets

(56) References Cited

U.S. PATENT DOCUMENTS

| | | | |
|---|---|---|---|
| 2009/0257379 A1* | 10/2009 | Robinson | H04W 16/14 |
| | | | 370/329 |
| 2017/0063484 A1* | 3/2017 | Naghshvar | H04L 47/29 |
| 2017/0374579 A1* | 12/2017 | Wang | H04W 28/0278 |
| 2018/0324101 A1* | 11/2018 | Panchai | H04W 76/16 |
| 2019/0260497 A1* | 8/2019 | Wang | H04L 5/0055 |
| 2019/0261233 A1* | 8/2019 | Duan | H04W 36/14 |
| 2020/0044940 A1* | 2/2020 | Thomasson | H04L 41/085 |
| 2021/0195675 A1* | 6/2021 | Park | H04W 88/14 |
| 2021/0345357 A1* | 11/2021 | Ijntema | H04L 45/64 |
| 2021/0368514 A1* | 11/2021 | Xing | H04W 72/087 |

* cited by examiner

PACKET DATA CONVERGENCE PROTOCOL TRAFFIC MONITORING

FIELD OF TECHNOLOGY

The following relates to wireless communications, including packet data convergence protocol (PDCP) traffic monitoring.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support packet data convergence protocol (PDCP) traffic monitoring. Generally, the described techniques provide for dynamically adjusting PDCP data splitting based on traffic parameters. In some examples, a wireless device may determine a data allocation between first and second radio access technologies. The wireless device may receive a first set of data traffic parameters from a layer, such as a medium access control (MAC) layer, at the wireless device, where the data traffic parameters may be associated with the first radio access technology. The wireless device may receive a second set of data traffic parameters from a layer, such as a MAC layer, at a second wireless device, where the data traffic parameters may be associated with the second radio access technology. The wireless device may adjust the data allocation to the first and second radio access technologies based on receiving the first and second sets of data traffic parameters.

A method of wireless communications at a first wireless device is described. The method may include allocating a first portion of data to a first radio access technology and a second portion of data to a second radio access technology, receiving, from a medium access control layer at a first wireless device, a first set of data traffic parameters associated with the first radio access technology, receiving, from a medium access control layer at a second wireless device, a second set of data traffic parameters associated with the second radio access technology, and adjusting the allocation of the first portion of data and the second portion of data to allocate an adjusted first portion of data to the first radio access technology and an adjusted second portion of data to the second radio access technology based on the first set of data traffic parameters and the second set of data traffic parameters.

An apparatus for wireless communications at a first wireless device is described. The apparatus may include a processor, memory coupled with the processor, and instructions stored in the memory. The instructions may be executable by the processor to cause the apparatus to allocate a first portion of data to a first radio access technology and a second portion of data to a second radio access technology, receive, from a medium access control layer at a first wireless device, a first set of data traffic parameters associated with the first radio access technology, receive, from a medium access control layer at a second wireless device, a second set of data traffic parameters associated with the second radio access technology, and adjust the allocation of the first portion of data and the second portion of data to allocate an adjusted first portion of data to the first radio access technology and an adjusted second portion of data to the second radio access technology based on the first set of data traffic parameters and the second set of data traffic parameters.

Another apparatus for wireless communications at a first wireless device is described. The apparatus may include means for allocating a first portion of data to a first radio access technology and a second portion of data to a second radio access technology, receiving, from a medium access control layer at a first wireless device, a first set of data traffic parameters associated with the first radio access technology, receiving, from a medium access control layer at a second wireless device, a second set of data traffic parameters associated with the second radio access technology, and adjusting the allocation of the first portion of data and the second portion of data to allocate an adjusted first portion of data to the first radio access technology and an adjusted second portion of data to the second radio access technology based on the first set of data traffic parameters and the second set of data traffic parameters.

A non-transitory computer-readable medium storing code for wireless communications at a first wireless device is described. The code may include instructions executable by a processor to allocate a first portion of data to a first radio access technology and a second portion of data to a second radio access technology, receive, from a medium access control layer at a first wireless device, a first set of data traffic parameters associated with the first radio access technology, receive, from a medium access control layer at a second wireless device, a second set of data traffic parameters associated with the second radio access technology, and adjust the allocation of the first portion of data and the second portion of data to allocate an adjusted first portion of data to the first radio access technology and an adjusted second portion of data to the second radio access technology based on the first set of data traffic parameters and the second set of data traffic parameters.

Some examples of the method, apparatuses, and non-transitory computer-readable medium described herein may further include operations, features, means, or instructions for communicating with a first user equipment (UE) associated with the first radio access technology based on the adjusted first portion of data, and communicating with a second UE associated with the second radio access technology based on the adjusted second portion of data.

Some examples of the method, apparatuses, and non-transitory computer-readable medium described herein may further include operations, features, means, or instructions for identifying a first traffic rate associated with the first radio access technology based on the first set of data traffic parameters, identifying a second traffic rate associated with the second radio access technology based on the second set of data traffic parameters, and determining that at least one of the first traffic rate or the second traffic rate satisfies a threshold, where adjusting the allocation of the first portion of data and the second portion of data may be based on the determining.

Some examples of the method, apparatuses, and non-transitory computer-readable medium described herein may further include operations, features, means, or instructions for identifying a first scheduling availability associated with the first radio access technology based on the first set of data traffic parameters, identifying a second scheduling availability associated with the second radio access technology based on the second set of data traffic parameters, and determining that at least one of the first scheduling availability or the second scheduling availability satisfies a threshold, where adjusting the allocation of the first portion of data and the second portion of data may be based on the determining.

Some examples of the method, apparatuses, and non-transitory computer-readable medium described herein may further include operations, features, means, or instructions for identifying a first congestion level associated with the first radio access technology based on the first set of data traffic parameters, identifying a second congestion level associated with the second radio access technology based on the second set of data traffic parameters, and determining that at least one of the first congestion level or the second congestion level does not satisfy a threshold, where adjusting the allocation of the first portion of data and the second portion of data may be based on the determining.

Some examples of the method, apparatuses, and non-transitory computer-readable medium described herein may further include operations, features, means, or instructions for identifying a first resource block utilization level associated with the first radio access technology based on the first set of data traffic parameters, identifying a second resource block utilization level associated with the second radio access technology based on the second set of data traffic parameters, and determining that at least one of the first resource block utilization level or the second resource block utilization level does not satisfy a threshold, where adjusting the allocation of the first portion of data and the second portion of data may be based on the determining.

Some examples of the method, apparatuses, and non-transitory computer-readable medium described herein may further include operations, features, means, or instructions for identifying a first transmission time interval utilization level associated with the first radio access technology based on the first set of data traffic parameters, identifying a second transmission time interval utilization level associated with the second radio access technology based on the second set of data traffic parameters, and determining that at least one of the first transmission time interval utilization level or the second transmission time interval utilization level does not satisfy a threshold, where adjusting the allocation of the first portion of data and the second portion of data may be based on the determining.

Some examples of the method, apparatuses, and non-transitory computer-readable medium described herein may further include operations, features, means, or instructions for identifying a first number of active users associated with the first radio access technology based on the first set of data traffic parameters, identifying a second number of active users associated with the second radio access technology based on the second set of data traffic parameters, and determining that at least one of the first number of active users or the second number of active users does not satisfy a threshold, where adjusting the allocation of the first portion of data and the second portion of data may be based on the determining.

Some examples of the method, apparatuses, and non-transitory computer-readable medium described herein may further include operations, features, means, or instructions for identifying a first error rate associated with the first radio access technology based on the first set of data traffic parameters, identifying a second error rate associated with the second radio access technology based on the second set of data traffic parameters, and determining that at least one of the first error rate or the second error rate does not satisfy a threshold, where adjusting the allocation of the first portion of data and the second portion of data may be based on the determining.

Some examples of the method, apparatuses, and non-transitory computer-readable medium described herein may further include operations, features, means, or instructions for identifying a first delay latency associated with the first radio access technology based on the first set of data traffic parameters, identifying a second delay latency associated with the second radio access technology based on the second set of data traffic parameters, and determining that at least one of the first delay latency or the second delay latency does not satisfy a threshold, where adjusting the allocation of the first portion of data and the second portion of data may be based on the determining.

Some examples of the method, apparatuses, and non-transitory computer-readable medium described herein may further include operations, features, means, or instructions for identifying a data rate associated with the first radio access technology based on the first set of data traffic parameters, and determining that the data rate associated with the first radio access technology may be less than a target data rate for the first radio access technology where adjusting the allocation of the first portion of data and the second portion of data may be based on the determining.

Some examples of the method, apparatuses, and non-transitory computer-readable medium described herein may further include operations, features, means, or instructions for identifying whether a UE associated with the first wireless device may be in a standalone mode of operation or a non-standalone mode of operation based on the first set of data traffic parameters, where adjusting the allocation of the first portion of data and the second portion of data may be based on the identified mode of operation.

In some examples of the method, apparatuses, and non-transitory computer-readable medium described herein, a throughput associated with a standalone mode of operation may be same as a throughput associated with a non-standalone mode of operation. Some examples of the method, apparatuses, and non-transitory computer-readable medium described herein may further include operations, features, means, or instructions for adjusting the allocation of the first portion of data and the second portion of data includes at least one of increasing the first portion of data, decreasing the first portion of data, increasing the second portion of data, decreasing the second portion of data, or a combination thereof.

Some examples of the method, apparatuses, and non-transitory computer-readable medium described herein may further include operations, features, means, or instructions for adjusting the allocation includes a step-wise adjusting of the allocation of the first portion of data and the second portion of data. In some examples of the method, apparatuses, and non-transitory computer-readable medium described herein, the first radio access technology includes New Radio (NR) and the second radio access technology includes Long Term Evolution (LTE). In some examples of the method, apparatuses, and non-transitory computer-readable medium described herein, the first radio access technology and the second radio access technology include a same radio access technology.

DETAILED DESCRIPTION

Figure 1:
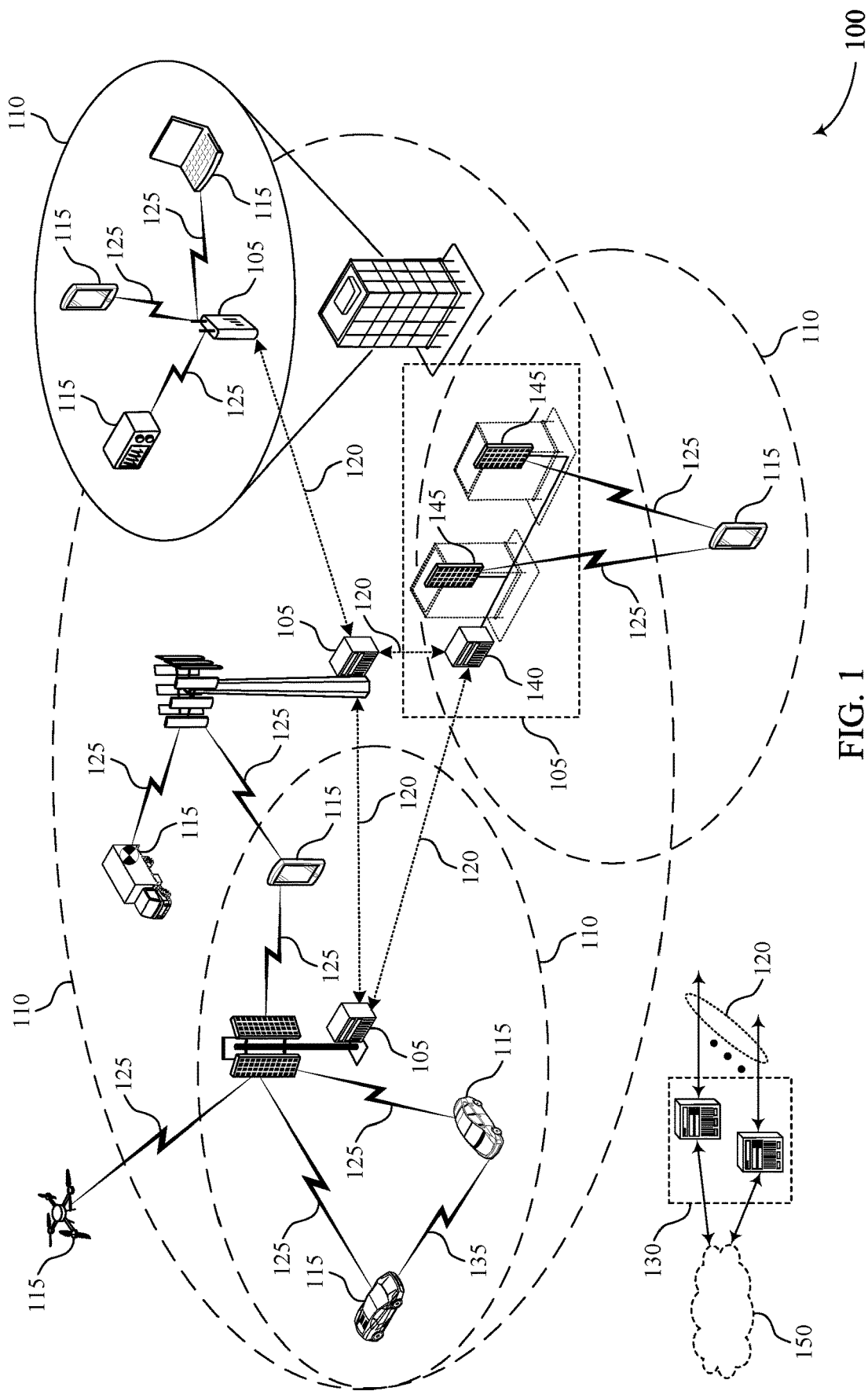
FIG. 1 illustrates an example of a wireless communications system that supports packet data convergence protocol (PDCP) traffic monitoring in accordance with aspects of the present disclosure.

A user equipment (UE) may support a standalone architecture, where the UE is served by one or more base stations associated with a single radio access technology. Additionally or alternatively, the UE may support a non-standalone architecture, where different radio access technologies may be utilized concurrently or simultaneously. For example, a non-standalone UE may anchor on or connect to a cell associated with a first radio access technology (e.g., Long-Term Evolution (LTE)), while facilitating communications with a cell associated with a second radio access technology (e.g., New Radio (NR)). In some cases, the cells associated with each radio access technology may be contained at a single base station or may be located on separate base stations.

Some wireless communications systems use data allocation schemes in which a packet data convergence protocol (PDCP) layer may split data among different entities. For example, a PDCP layer may split data between a radio link control (RLC) layer associated with a first radio access technology and an RLC layer associated with a second radio access technology. One or more RLC layers may coordinate with a medium access control (MAC) layer to allocate data to one or more UEs. In some examples, a first MAC layer associated with a first radio access technology and a second MAC layer associated with a second radio access technology may be configured to aid in scheduling data for a UE (e.g., a UE in a non-standalone mode of operation). However, the PDCP layer may not have access to all relevant parameters used by the MAC layers to schedule the data traffic. Thus, data allocations may be uneven across two radio access technologies, or across different UEs, or both in various system topologies (e.g., in dual-connectivity mode, using carrier aggregation, etc.).

To address data allocation and to maintain quality of service standards for one or more UEs, a wireless device (e.g., a PDCP layer at a wireless device) may periodically receive a set of data traffic parameters from MAC layers associated with two radio access technologies. In some examples, the wireless device may include one or more base stations. In some examples, the wireless device may include an entity of a core network. In some examples, a wireless device may initially allocate a first portion of data to a first radio access technology and a second portion of data to a second radio access technology. The wireless device may then receive data traffic parameters from a first MAC layer associated with the first radio access technology and from a second MAC layer associated with the second radio access technology. In some examples, the wireless device may determine whether the served UEs are one or more modes of operation, such as in standalone modes of operation or non-standalone modes of operation. Based on the received data traffic parameters, the wireless device may adjust the data allocation to the first radio access technology and second radio access technology to maintain balance and quality of service across multiple radio access technologies.

UEs and base stations capable of supporting PDCP traffic monitoring may utilize the techniques described in accordance to one or more aspects of the present disclosure to experience power saving, such as reduced power consumption and extended battery life, while also ensuring reliable and efficient communications between UEs and base stations. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations, including that the UEs may support high reliability and low latency communications more efficiently and effectively, among other examples, in accordance with aspects of the present disclosure. The described techniques may include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of a protocol stack, a traffic monitoring scheme, and a process flow. Aspects of the disclosure are further illustrated by and described with reference to apparatus diagrams, system diagrams, and flowcharts that relate to PDCP traffic monitoring.

FIG. 1 illustrates an example of a wireless communications system 100 that supports PDCP traffic monitoring in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or various functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

One or more aspects of the present disclosure provide for maintaining balance and quality of service in data allocation across multiple radio access technologies. In some examples, a base station 105 may allocate data between a first radio access technology (e.g., NR) and a second radio access technology (e.g., LTE). The base station 105 may receive a first set of data traffic parameters from a medium access control layer at the base station 105, where the data traffic parameters are associated with the first radio access technology. The base station 105 may receive a second set of data traffic parameters from a medium access control layer at a second base station 105, where the data traffic parameters are associated with the second radio access technology. The base station 105 may adjust the data allocation to the first radio access technology and the second radio access technology based on receiving the first set of data traffic parameters and the second set of data traffic parameters.

Figure 2:
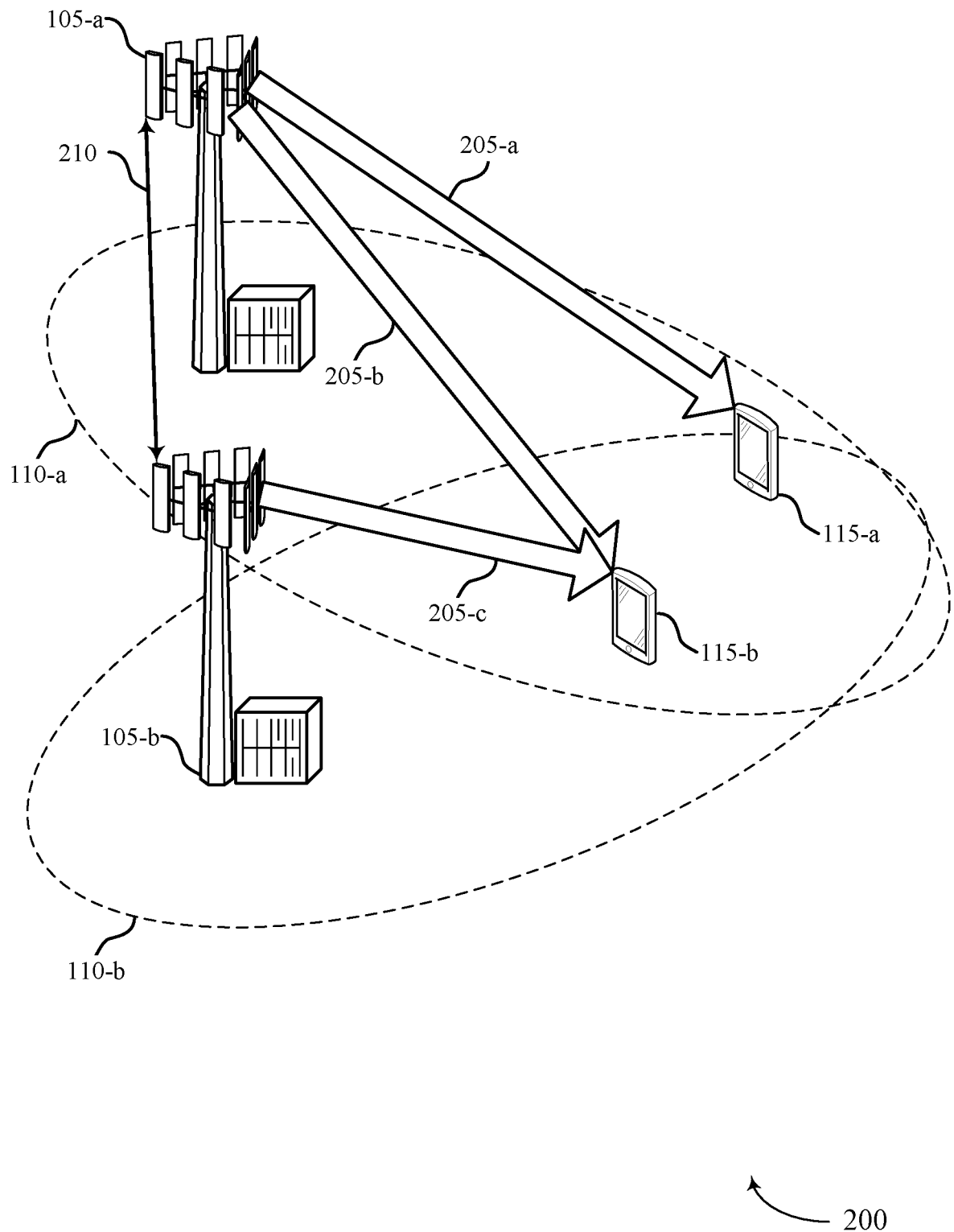
FIG. 2 illustrates an example of a wireless communications system that supports PDCP traffic monitoring in accordance with aspects of the present disclosure.

FIG. 2 illustrates an example of a wireless communications system 200 that supports PDCP traffic monitoring in accordance with aspects of the present disclosure. In some examples, the wireless communications system 200 may implement one or more aspects of a wireless communications system 100 as described with reference to FIG. 1. The wireless communications system 200 may include a UE 115-a and a UE 115-b which may be examples of a UE 115 as described with reference to FIG. 1. The wireless communications system 200 may also include a base station 105-a and a base station 105-b which may be examples of a base station 105 as described with reference to FIG. 1. The base stations 105-a and 105-b may each be associated with a cell providing wireless communications services with respective coverage areas 110-a and 110-b.

In some examples, the UE 115-a may establish a connection with the base station 105-b where the base station 105-b shares information via a channel 205-a. In some implementations, the UE 115-a may establish a standalone connection with the base station 105-a. In some implementations, the base station 105-a may support a carrier aggregation scheme where the base station 105-a shares information with the UE 115-a via one or more component carriers (e.g., radio frequency bands). In some examples, the UE 115-a may establish connections with the base station 105-a, the base station 105-b, or both. In some implementations, the UE 115-a may establish a non-standalone connection. That is, the UE 115 a may support a non-standalone architecture, where different radio access technologies (RATs) are utilized simultaneously by different serving base stations. For example, a non-standalone UE may anchor on or connect to a first cell while facilitating communications with a second cell. Additionally or alternatively, a non-standalone UE may anchor on or connect to a cell associated with a first radio access technology (e.g., LTE), while facilitating communications with a cell associated with a second radio access technology (e.g., NR). In some cases, the cells associated with each radio access technology may be contained at a single base station or may be located on separate base stations. In one example, the base station 105 a and 105-b may support a non-standalone 5G network. In some cases, a network may refer to a cell.

According to one or more examples, the base station 105-a may share information with the UE 115-a via a channel 205-b and the base station 105-b may share information with the UE 115-a via a channel 205-c. In some implementations the base stations 105-a and 105-b may support a carrier aggregation scheme where the base stations 105-a and 105-b share information with the UE 115-b via one or more component carriers (e.g., radio frequency bands). In some examples, the base stations 105-a and 105-b may share information via a link 210 (e.g., a backhaul link). In some implementations the base station 105-a may operate according to a first radio access technology (e.g., NR) and the base station 105-b may operate according to a second radio access technology (e.g., LTE). In some implementations, the base station 105-a and the base station 105-b may operate according to a same radio access technology.

Some wireless communications systems use data allocation schemes in which a PDCP layer associated with a wireless device splits data to different entities. In some examples, the base stations 105-a and 105-b may support PDCP data splitting techniques where data traffic is split between the first radio access technology and the second radio access technology. For instance, a PDCP layer may split data between an LTE RLC layer and an NR RLC layer. A UE may receive data from both the LTE and NR entities. A PDCP layer associated with the base station 105-a may allocate data between the radio access technology associated with the base station 105-a and the radio access technology associated with the base station 105-b. Accordingly, the UE 115-b may receive a first portion of data from the base station 105-a via the channel 205-b and a second portion of data from the base station 105-b via the channel 205-c. In some implementations, a PDCP layer associated with the base station 105-b may determine the data allocation in place of the PDCP layer associated with the base station 105-a.

In some wireless communications systems, a traffic flow split for non-standalone architecture may be determined at the PDCP layer such that a first radio access technology (e.g., NR) governs an amount of data split to a node associated with a second radio access technology (e.g., LTE node). In such cases, the RLC layer at the node associated with a second radio access technology (e.g., LTE node) may feedback information (e.g., data rate) to the PDCP layer associated with the first radio access technology (e.g., NR). However, the PDCP layer does not have access to all relevant parameters used by MAC layers to schedule data traffic. Thus, data allocations may be uneven or unbalanced between two radio access technologies or between different UEs in various system topologies (e.g., in dual-connectivity mode, using carrier aggregation, etc.).

As described herein, some wireless networks may be configured to operate in a dual-connectivity configuration. For example, a wireless network may be configured to operate in an evolved universal terrestrial radio access network (E-UTRAN) in NR, which may be referred to as EN-DC, as 5G EN-DC, or as a 5G NR dual-connectivity configuration or system, or some combination thereof. Broadly, the dual-connectivity configuration supports the UE being connected to two devices, such as base stations, (or nodes) at the same time. In some examples, one node (e.g., a master node) may be a 5G (e.g., an NR) node and a second node (e.g., a secondary node) may be an LTE node. In other examples, the master node may be an LTE node and the secondary node may be a 5G (e.g., NR) node. In some examples, the master node and the secondary node may be 5G (e.g., NR) nodes or they may both be LTE nodes. The dual-connectivity configuration may be supported when inter-connectivity has been established between the master node and secondary node, via one or more backhaul links, core network functions, or the like. Some examples of dual-connectivity may include the UE being simultaneously connected to the LTE and 5G NR node or the UE utilizing the LTE node for control plane information and the 5G NR node for user plane traffic, or any combination thereof. In some aspects, the dual-connectivity configuration may support direct or split signaling radio bearers (or both).

In some wireless communications systems, a UE may be assigned a data rate according to, for example, a subscriber profile. In such cases, a scheduler may schedule data for this UE based on subscriber information as part of quality of service implementation. In some dual-connectivity split configurations (e.g., EN-DC split configuration), the scheduler behavior at each MAC layer (e.g., LTE MAC layer and NR MAC layer) may be independent. That is, the NR MAC layer may not know an amount of data sent to the LTE MAC layer. For example, the NR MAC layer may not be aware of the amount of data being received by the UE from both LTE and NR airlinks.

In some wireless communications systems, the MAC layer may not allocate data based on an operating mode (e.g., a standalone mode of operation or a non-standalone mode of operation) of the served UEs. In one example, a sum of throughput in NR and LTE may be same as a throughput associated with a non-standalone mode of operation. Additionally or alternatively, a throughput in NR may be same as a throughput associated with a standalone mode of operation. Without considering quality of service while allocating data to different radio access technologies or different UEs in different modes of operations, throughput of a UE operating in a non-standalone mode of operation may be greater, equal to, or less than throughput of a UE operating in a standalone mode of operation. In some examples, various quality of logic channel priority, delay budget difference, and throughput target.

Some wireless communications systems may support more than one carrier (not shown). In wireless communications systems supporting multiple carriers, both dual connectivity and carrier aggregation may be considered during data allocation. In carrier aggregation, a single MAC entity may control the traffic fairness level (e.g., traffic balance level) at MAC layer or at carrier level. Dual connectivity may support MAC entities in both LTE and NR working independently of each other. Some wireless communications systems do not provide for dynamic adjustment of data traffic allocation to account for carrier aggregation. Thus, method for splitting or adjusting an existing split of data traffic split at the PDCP layer is desired.

To maintain balance in relation to the data allocation between the first radio access technology, the second radio access technology, and UEs 115 operating in the wireless communications system 200, one or more aspects of the present disclosure provide for a PDCP layer to receive data traffic parameters associated with each radio access technology. For example, if a PDCP layer associated with the base station 105-*a* determines a data allocation between the base station 105-*a* and the base station 105-*b*, the PDCP layer may receive a first set of data traffic parameters from a first MAC layer associated with the base station 105-*a* and a second set of data traffic parameters from a second MAC layer associated with the base station 105-*b*. In some implementations, the PDCP layer may periodically receive traffic parameters from the first and second MAC layers. The PDCP layer associated with the base station 105-*a* may adjust the allocation of data based on receiving the data traffic parameters. In some examples, the PDCP layer may periodically adjust the data allocation (e.g., in a step-wise manner) based on receiving traffic parameters from the MAC layers. In some example, in which the base station 105-*a* and the base station 105-*b* support carrier aggregation, the PDCP layer may adjust a data allocation between component carriers based on the traffic parameters.

In some examples, a PDCP layer associated with the base station 105-*a* may determine that one or more of a traffic rate, a MAC scheduling availability, a congestion-level, a resource block utilization, a transmission time interval utilization, a number of active users, an error rate, or a delay latency associated with the first or second radio access technologies (or both) does not satisfy a threshold based on receiving the data traffic parameters from the first and second MAC layers. The PDCP layer may adjust the allocation based on comparing the one or more traffic parameters to a threshold. For example, the PDCP layer may determine that a traffic rate associated with the first radio access technology or second radio access technology is less than a threshold rate and may adjust the allocation such that the threshold rate is met or exceeded for the first radio access technology or second radio access technology.

In some examples, the PDCP layer associated with the base station 105-*a* may determine, based on receiving the data traffic parameters, that a data rate associated with the UE 115-*a* is not equal to a data rate associated with the UE 115-*b*. For example, the PDCP layer may determine that a data rate associated with the UE 115-*a* is less than a data rate associated with the UE 115-*b*. Accordingly, the PDCP layer may adjust a data allocation such that the data rate associated with the UE 115-*a* is equal to the data rate associated with the UE 115-*b*. Implementing one or more aspects of the present disclosure may allow the wireless communications system 200 to maintain balance or quality of service standards for one or more base stations 105 or UEs 115.

Figure 3:
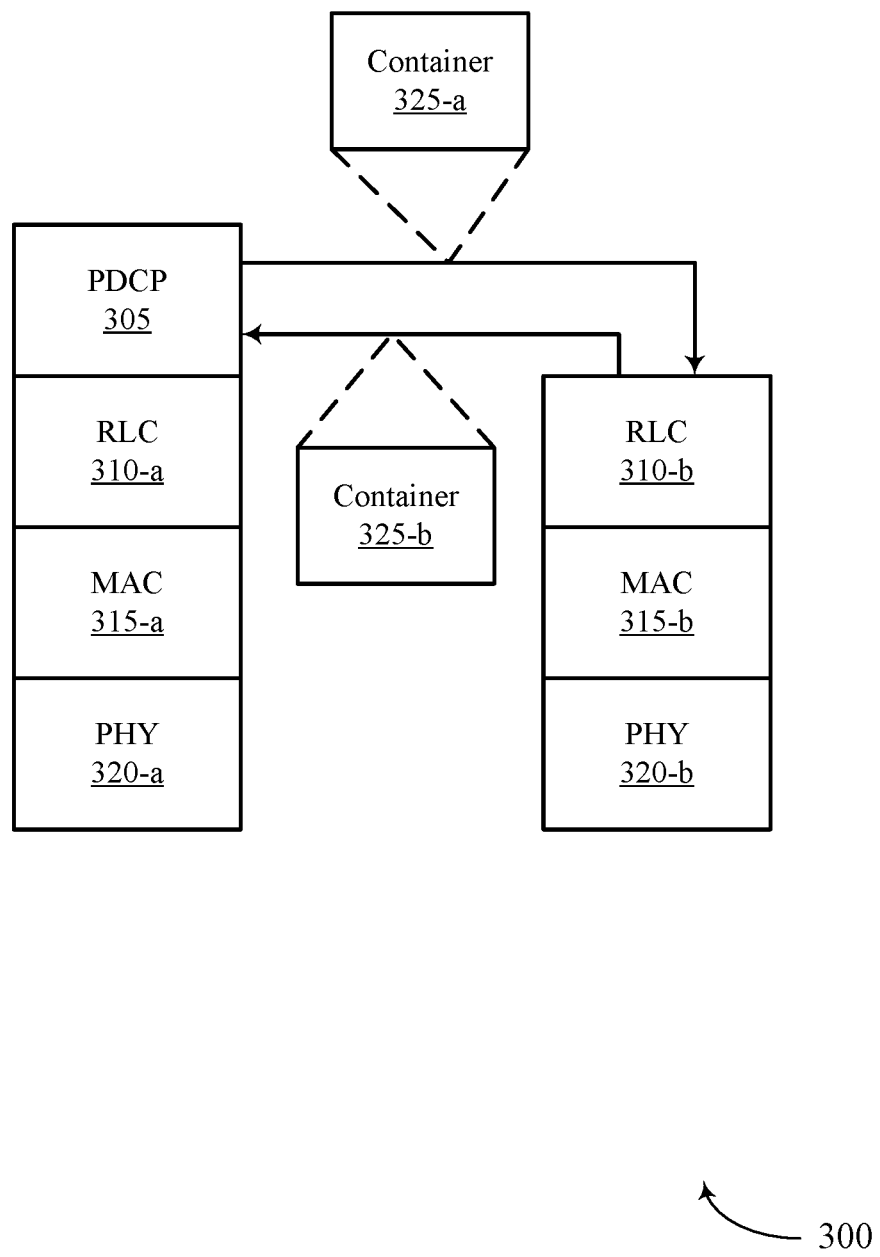
FIG. 3 illustrates an example of a protocol stack that supports PDCP traffic monitoring in accordance with aspects of the present disclosure.

FIG. 3 illustrates an example of a protocol stack 300 that supports PDCP traffic monitoring in accordance with aspects of the present disclosure. In some examples, the protocol stack 300 may be implemented by or may implement one or more aspects of a wireless communications system 100 or 200 as described with reference to FIGS. 1 and 2. The protocol stack 300 may include a PDCP layer 305, RLC layers 310, MAC layers 315, and physical (PHY) layers 320. One or more aspects of the protocol stack 300 may be implemented by a core network, or one or more base stations 105, which may be examples of corresponding devices as described in FIGS. 1 and 2.

In the example of FIG. 3, the PDCP layer 305, the RLC layer 310-*a*, the MAC layer 315-*a*, and the PHY layer 320-*a* may be associated with a first wireless device and the RLC layer 310-*b*, the MAC layer 315-*b*, and the PHY layer 320-*b* may be associated with a second wireless device. In some examples, the first wireless device may be associated with a first radio access technology and the second wireless device may be associated with a second radio access technology. Additionally or alternatively, each of the first wireless device and the second wireless device may be associated with multiple radio access technologies (e.g., non-standalone architecture).

In some wireless communications systems, a PDCP layer 305 may allocate data traffic between the RLC layer 310-*a* and the RLC layer 310-*b*. For example, the PDCP layer 305 may allocate a first portion of data traffic to the RLC layer 310-*a* and a second portion of data traffic to the RLC layer 310-*b*. In some examples, the RLC layer 310-*a* may be associated with a first radio access technology and the RLC layer 310-*b* may be associated with a second radio access technology. As described herein, the RLC layer 310-*b* may be associated with LTE and may be referred to as RLC of an assisting node and the RLC layer 310-*a* may be associated with NR. In some examples, the PDCP layer 305 may share information with the RLC layer 310-*a* and the RLC layer 310-*b*. For example, the PDCP layer 305 may share data via a container 325-*a*. The container 325-*a* may also be referred to as a protocol data unit and may include downlink user data. In some implementations, the container 325-*a* may be formatted according to data formats shown in Tables 1 and 2. For example, the PDCP layer 305 may share user data according to the data format shown in Table 1.

TABLE 1

| Bits | | | | | | | | Number |
|---|---|---|---|---|---|---|---|---|
| 7 | 6 | 5 | 4 | 3 | 2 | 1 | 0 | of Octets |
| Protocol Data Unit (PDU) Type (=0) | | | Spare | | Downlink (DL) Discard Blocks | DL Flush | Report Polling | 1 |
| Spare | | | | Report Delivered | User Data Existence Flag | Assistance Info. Report Polling Flag | Retransmission Flag | 1 |
| NR-U Sequence Number | | | | | | | | 3 |
| DL Discard NR PDCP PDU SN | | | | | | | | 0 or 3 |
| DL Discard Number of Blocks | | | | | | | | 0 or 1 |
| DL Discard NR PDCP PDU SN Start (First Block) | | | | | | | | 0 or 3 |
| Discard Block Size (First Block) | | | | | | | | 0 or 1 |
| . . . | | | | | | | | |
| DL Discard NR PDCP PDU SN Start (Last Block) | | | | | | | | 0 or 3 |
| Discard Block Size (Last Block) | | | | | | | | 0 or 1 |
| DL Report NR PDCP DPU SN | | | | | | | | 0 or 3 |
| Padding | | | | | | | | 0-3 |

For example, as shown in Table 1, the PDCP layer 305 may share one or more flags with the RLC layer 310-*a* and the RLC layer 310-*b*. In some implementations, the flags may include bits indicating a protocol data unit type, bits indicating existence of user data, bits indicating downlink discard PDCP protocol data unit sequence number, among other flags. In some examples, each flag may include a number of octets corresponding to an amount of data indicated by the flag.

As described herein, the PDCP layer 305 may share additional assistance information according to the data format shown in Table 2. For example, the PDCP layer 305 may share one or more flags with the RLC layer 310-*a* and the RLC layer 310-*b*. In some implementations, the flags may include bits indicating one or more of a PDCP duplication suggestion, existence of assistance information, a number of information fields, a type of assistance information, radio quality assistance information, among other flags.

TABLE 2

| Bits | | | | | | | | Number of Octets |
|---|---|---|---|---|---|---|---|---|
| 7 | 6 | 5 | 4 | 3 | 2 | 1 | 0 | |
| PDU Type (=2) | | | | PDCP Duplication Indication | Assistance Info. Indication | | Spare | 1 |
| Spare | | | | | | | PDCP Dupl. Activation Suggestions | 1 |
| Number of Assistance Information Fields | | | | | | | | 0 or 1 |
| Assistance Information Type | | | | | | | | 0 or 2* |
| Number of Octets for Radio Quality Assistance Information Fields | | | | | | | | Number of Fields |
| Radio Quality Assistance Information | | | | | | | | + Number Octets |

In some implementations, the RLC layer 310-*a* and the RLC layer 310-*b* may share the information with MAC layer 315-*a* and MAC layer 315-*b* respectively. In some examples, the MAC layer 315-*a* and the MAC layer 315-*b* may schedule data traffic according to the allocation determined by the PDCP layer 305. In some examples, the RLC layer 310-*a* and the RLC layer 310-*b* may report information to the PDCP layer 305 via a container 325-*b*. In particular, the RLC layer 310-*b* of the assisting node (e.g., RLC LTE) may transfer feedback to allow the PDCP layer 305 (e.g., PDCP NR) to control the downlink user data flow (e.g., via downlink data delivery status). In some examples, the information reported to the PDCP layer 305 may include data delivery status information indicating whether data was successfully delivered to one or more wireless devices. In some implementations, the container 325-*b* may be formatted according to a data format as shown in Table 2.

In some examples, the RLC layer 310-*a* and the RLC layer 310-*b* may report one or more flags to the PDCP layer 305 via the container 325-*b*. In some implementations, the flags may include bits indicating one or more of highest transmitted PDCP sequence number, a highest delivered PDCP sequence number, a lost packet report, a data rate, a retransmitted PDCP sequence number, a delivered retransmitted PDCP sequence number, a cause report, a desired buffer size, a desired data rate, among other flags. In some examples, the PDCP layer 305 may determine data traffic allocation or other data traffic parameters based on receiving the data delivery status information from the RLC layer 310-*a* and the RLC layer 310-*b*.

TABLE 3

| Bits | | | | | | | | Number of Octets |
|---|---|---|---|---|---|---|---|---|
| 7 | 6 | 5 | 4 | 3 | 2 | 1 | 0 | |
| PDU Type (=1) | Highest Transmitted NR PDCP SN Ind. | | | Highest Delivered NR PDCP SN Ind. | Final Frame Ind. | | Lost Packet Report | 1 |
| Spare | Data Rate Ind. | | | Retransmitted NR PDCP | Delivered Retransmitted | | Cause Report | 1 |

TABLE 3-continued

| Bits | | | | | | | | Number of Octets |
|---|---|---|---|---|---|---|---|---|
| 7 | 6 | 5 | 4 | 3 | 2 | 1 | 0 | |
| SN Ind. | | | | | NR PDCP SN Ind. | | | |
| Desired Buffer Size for the Data Radio Bearer | | | | | | | | 4 |
| Desired Data Rate | | | | | | | | 0 or 4 |
| Number of Lost NR-U Sequence Number Ranges Reported | | | | | | | | 0 or 1 |
| Start of Lost NR-U Sequence Number Range | | | | | | | | 0 or 6* |
| End of Lost NR-U Sequence Number Range | | | | | | | | Number of Lost NR-U SN Ranges |
| Highest Successfully Delivered NR PDCP Sequence Number | | | | | | | | 0 or 3 |
| Highest Transmitted NR PDCP Sequence Number | | | | | | | | 0 or 3 |
| Cause Value | | | | | | | | 0 or 1 |
| Successfully Delivered Retransmitted NR PDCP Sequence Number | | | | | | | | 0 or 3 |
| Retransmitted NR PDCP Sequence Number | | | | | | | | 0 or 3 |
| Padding | | | | | | | | 0-3 |

Figure 4:
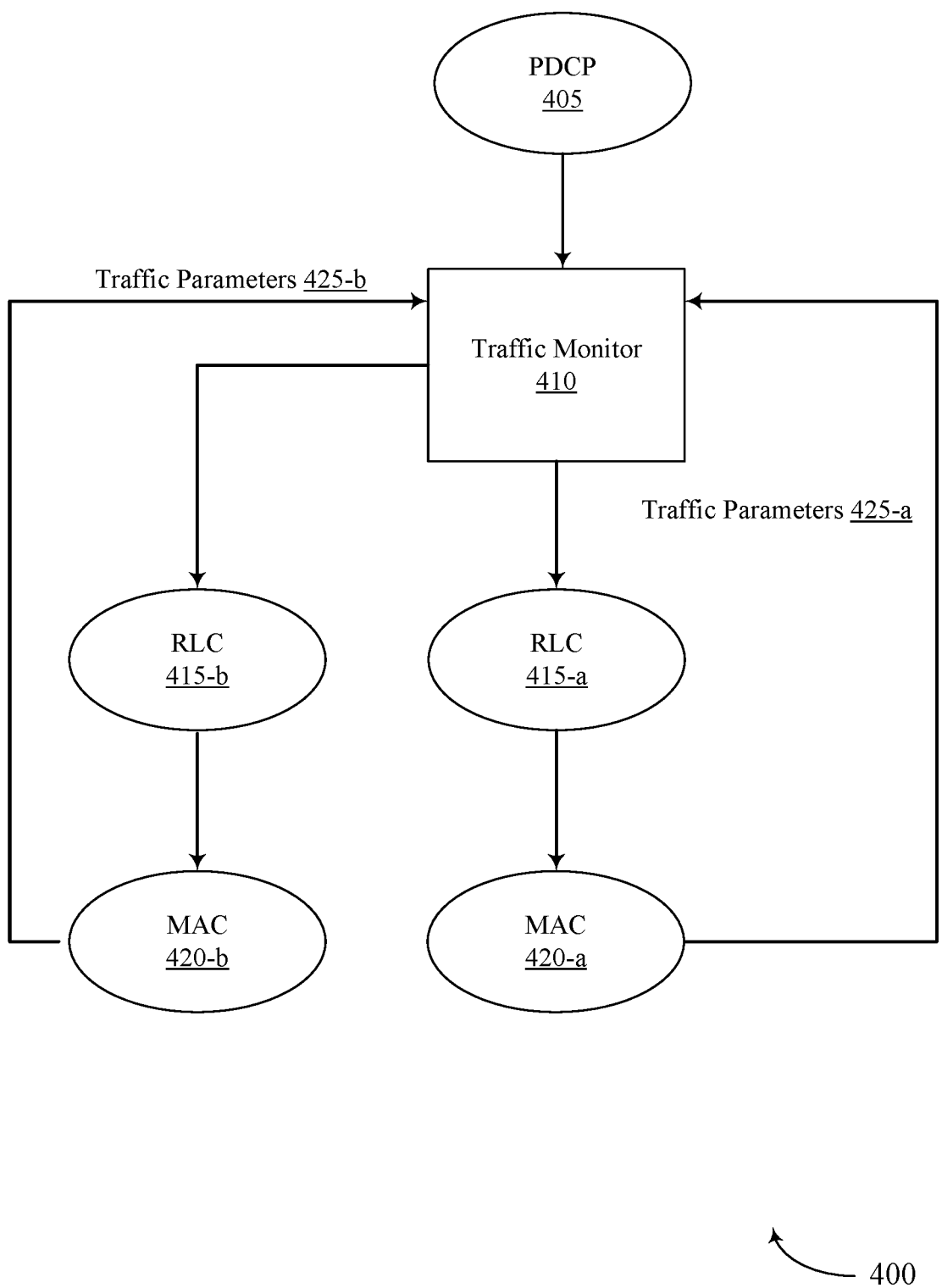
FIG. 4 illustrates an example of a traffic monitoring scheme that supports PDCP traffic monitoring in accordance with aspects of the present disclosure.

One or more aspects of the present disclosure provides for methods to maintain balance or quality of service standards for one or more UEs. In some examples, a PDCP layer may periodically receive a set of data traffic parameters from MAC layers associated with two radio access technologies. As depicted in the example of FIG. 3, the MAC layer 315-*a* and the MAC layer 315-*b* may report additional data traffic information to the PDCP layer 305 (instead of going through the RLC layers). In some examples, the PDCP layer 305 may receive data traffic parameters from an NR MAC layer 315-*a* and an LTE MAC layer 315-*b*. Additionally or alternatively, the PDCP layer 305 may receive data traffic parameters from an NR MAC layer 315-*a* serving a UE in a standalone mode and an NR MAC layer 315-*b* serving a UE in non-standalone mode. In some examples, the MAC layer 315-*a* and the MAC layer 315-*b* may report one or more of a traffic rate, a scheduling availability, a resource block utilization, a transmission time interval utilization, a number of active users, an error rate, a congestion level, a delay latency to the PDCP layer 305. Based on the received data traffic information, the PDCP layer 305 may adjust an allocation of data across the first wireless device and the second wireless device to maintain balance and quality of service FIG. 4 illustrates an example of a traffic monitoring scheme 400 that supports PDCP traffic monitoring in accordance with aspects of the present disclosure. In some examples, the traffic monitoring scheme 400 may be implemented by or may implement one or more aspects of a wireless communications system 100 or 200, a protocol stack 300, or any combination thereof as described with reference to FIGS. 1 through 3. The traffic monitoring scheme 400 may include a PDCP layer 405, a traffic monitor 410, RLC layer 415-*a*, RLC layer 415-*b*, MAC layer 420-*a*, and MAC layer 420-*b*. The traffic monitoring scheme 400 may be implemented by one or more base stations 105, one or more UEs 115, or a combination thereof. In some examples, the traffic monitoring scheme 400 may be implemented to enable a wireless communications system to maintain balance or quality of service standards for one or more UEs.

According to one or more aspects of the present disclosure, the PDCP layer 405 may initially allocate a first portion of data traffic to the RLC layer 415-a and a second portion of data traffic to the RLC layer 415-b. The RLC layer 415-a and the RLC layer 415-b may receive the allocation information from the PDCP layer 405 (e.g., via traffic monitor 410) and may share information associated with the data allocation with their respective MAC layers. For example, the RLC layer 415-a may send or otherwise indicate the allocation of the first portion of data traffic to the MAC layer 420-a. Additionally or alternatively, the RLC layer 415-b may send or otherwise indicate the allocation of the second portion of data traffic to the MAC layer 420-b. The MAC layer 420-a and the MAC layer 420-b may schedule data traffic based on the initial allocation determined by the PDCP layer 405. In some implementations, the RLC layer 415-a and the MAC layer 420-a may be associated with a first radio access technology (e.g., NR) and the RLC layer 415-b and the MAC layer 420-b may be associated with a second radio access technology (e.g., LTE) or vice versa. In some examples, the RLC layer 415-a and the MAC layer 420-a, and the RLC layer 415-b and the MAC layer 420-b may be associated with the same radio access technology.

To maintain balance or quality of service standards, the MAC layer 420-a may report a set of data traffic parameters 425-a to the PDCP layer 405. Similarly, the MAC layer 420-b may report a set of data traffic parameters 425-b to the PDCP layer 405. Additionally or alternatively, the PDCP layer 405 may collect information whether one or more UEs served by the MAC layer 420-a or the MAC layer 420-b are operating in standalone mode or non-standalone mode based on their corresponding traffic information. In some implementations the set of data traffic parameter 425-a and the set of data traffic parameter 425-b may include one or more of a traffic rate (e.g., an aggregate maximum bit Rate (AMBR)), a MAC scheduling availability, a congestion level, a resource block utilization, a transmission time interval utilization, a number of active users, an error rate (e.g., a block error rate (BLER)), or a delay latency. In response to receiving the set of data traffic parameter 425-a and the set of data traffic parameter 425-bb, the PDCP layer 405 may adjust the data allocation.

In some examples, the PDCP layer 405 may identify a first traffic rate associated with the MAC layer 420-a based on the set of data traffic parameter 425-a. Additionally or alternatively, the PDCP layer 405 may identify a second traffic rate associated the MAC layer 420-b based on the set of data traffic parameter 425-b. The PDCP layer 405 may determine that at least one of the first traffic rate or the second traffic rate satisfies a threshold. In some examples, the PDCP layer 405 may determine that the first traffic rate or the second traffic rate is less than a threshold traffic rate (e.g., X1=400 Mbps). If the PDCP layer 405 determines that the first traffic rate is less than the threshold traffic rate, then the PDCP layer 405 may increase the allocation of the first portion of data traffic such that the first traffic rate satisfies the traffic rate.

According to one example, if the MAC layer 420-a (e.g., MAC layer associated with NR) reports data rate to be greater than threshold traffic rate (e.g., X1=400 Mbps), then the PDCP layer 405 may forward 100% data to RLC layer 415-a (e.g., RLC layer associated with NR). In some examples, if the MAC layer 420-a (e.g., MAC layer associated with NR) reports data rate to be less than threshold traffic rate (e.g., X1=400 Mbps), then the PDCP layer 405 mat adjust data allocation to allocate data to MAC layer 420-b (e.g., MAC layer associated with LTE) based on the data rate reported by the MAC layer 420-a. In some cases, the data adjustment amount may be according to the following equation 1:

$$\text{data split amount}=\text{Guarantee}-\text{data rate reported by NR MAC layer} \quad (1)$$

In some examples, the PDCP layer 405 may identify a first scheduling availability (e.g., MAC scheduling availability) associated with the MAC layer 420-a based on the set of data traffic parameter 425-a. Additionally or alternatively, the PDCP layer 405 may identify a second scheduling availability (e.g., MAC scheduling availability) associated the MAC layer 420-b based on the set of data traffic parameter 425-b. The PDCP layer 405 may determine that at least one of the first scheduling availability or the second scheduling availability satisfies a threshold. In some examples, the PDCP layer 405 may determine that the first scheduling availability or the second scheduling availability is less than a threshold scheduling percentage (e.g., X2=20% scheduling availability). If the PDCP layer 405 determines that the first scheduling availability is less than the threshold scheduling percentage, then the PDCP layer 405 may increase the allocation of the first portion of data traffic such that the first traffic rate satisfies the threshold scheduling percentage.

In some examples, the PDCP layer 405 may identify a first congestion level (e.g., base station congestion level) associated with the MAC layer 420-a based on the set of data traffic parameter 425-a. Additionally or alternatively, the PDCP layer 405 may identify a second congestion level (e.g., base station congestion level) associated the MAC layer 420-b based on the set of data traffic parameter 425-b. The PDCP layer 405 may determine that at least one of the first congestion level or the second congestion level does not satisfy a threshold. In some examples, the PDCP layer 405 may determine that the first congestion level or the second congestion level is over a congestion level threshold (e.g., X3=70% congestion level). If the PDCP layer 405 determines that the first congestion level is greater than the congestion level threshold, then the PDCP layer 405 may decrease the allocation of the first portion of data traffic such that the first traffic rate satisfies the congestion level threshold.

In some examples, the PDCP layer 405 may identify a first resource block utilization level associated with the MAC layer 420-a based on the set of data traffic parameter 425-a. Additionally or alternatively, the PDCP layer 405 may identify a second resource block utilization level associated the MAC layer 420-b based on the set of data traffic parameter 425-b. The PDCP layer 405 may determine that at least one of the first resource block utilization level or the second resource block utilization level does not satisfy a threshold. In some examples, the PDCP layer 405 may determine that the first resource block utilization level or the second resource block utilization level is over a resource block utilization level threshold percentage (e.g., X4=70% resource block utilization level). If the PDCP layer 405 determines that the first resource block utilization level is greater than the resource block utilization level threshold percentage, then the PDCP layer 405 may decrease the allocation of the first portion of data traffic such that the first traffic rate satisfies the resource block utilization level threshold percentage.

In some examples, the PDCP layer 405 may identify a first transmission time interval utilization level associated with the MAC layer 420-a based on the set of data traffic parameter 425-a. Additionally or alternatively, the PDCP layer 405 may identify a second transmission time interval utilization level associated the MAC layer 420-*b* based on the set of data traffic parameter 425-*b*. The PDCP layer 405 may determine that at least one of the first transmission time interval utilization level or the second transmission time interval utilization level does not satisfy a threshold. In some examples, the PDCP layer 405 may determine that the first transmission time interval utilization level or the second transmission time interval utilization level is over a transmission time interval utilization level threshold percentage (e.g., X5=70% transmission time interval utilization level). If the PDCP layer 405 determines that the first transmission time interval utilization level is greater than the transmission time interval utilization level threshold percentage, then the PDCP layer 405 may decrease the allocation of the first portion of data traffic such that the first traffic rate satisfies the transmission time interval utilization level threshold percentage.

In some examples, the PDCP layer 405 may identify a first number of active users associated with the MAC layer 420-*a* based on the set of data traffic parameter 425-*a*. Additionally or alternatively, the PDCP layer 405 may identify a second number of active users associated the MAC layer 420-*b* based on the set of data traffic parameter 425-*b*. The PDCP layer 405 may determine that at least one of the first number of active users or the second number of active users does not satisfy a threshold. In some examples, the PDCP layer 405 may determine that the first number of active users or the second number of active users is over an active user threshold percentage (e.g., X6=70% number of active users). If the PDCP layer 405 determines that the first number of active users is greater than the active user threshold percentage, then the PDCP layer 405 may decrease the allocation of the first portion of data traffic such that the first traffic rate satisfies the active user threshold percentage.

In some examples, the PDCP layer 405 may identify a first error rate (e.g., MAC retransmission rate) associated with the MAC layer 420-*a* based on the set of data traffic parameter 425-*a*. Additionally or alternatively, the PDCP layer 405 may identify a second error rate (e.g., MAC retransmission rate) associated the MAC layer 420-*b* based on the set of data traffic parameter 425-*b*. The PDCP layer 405 may determine that at least one of the first error rate or the second error rate does not satisfy a threshold. In some examples, the PDCP layer 405 may determine that the first error rate or the second error rate is over a threshold percentage (e.g., X7=70% error rate level). If the PDCP layer 405 determines that the first error rate is greater than the threshold percentage, then the PDCP layer 405 may decrease the allocation of the first portion of data traffic such that the first traffic rate satisfies the threshold percentage.

In some examples, the PDCP layer 405 may identify a first delay latency associated with the MAC layer 420-*a* based on the set of data traffic parameter 425-*a*. Additionally or alternatively, the PDCP layer 405 may identify a second delay latency associated the MAC layer 420-*b* based on the set of data traffic parameter 425-*b*. The PDCP layer 405 may determine that at least one of the first delay latency or the second delay latency does not satisfy a threshold. In some examples, the PDCP layer 405 may determine that the first delay latency or the second delay latency is over a threshold delay latency. If the PDCP layer 405 determines that the first delay latency is greater than the threshold delay latency, then the PDCP layer 405 may decrease the allocation of the first portion of data traffic such that the first traffic rate satisfies the threshold delay latency.

According to one or more aspects of the present disclosure, the PDCP layer 405 may identify whether a UE associated with the MAC layer 420-*a* is in a standalone mode of operation or a non-standalone mode of operation based on the set of data traffic parameters 425-*a*. Additionally or alternatively, the PDCP layer 405 may identify whether a UE associated with the MAC layer 420-*b* is in a standalone mode of operation or a non-standalone mode of operation based on the set of data traffic parameters 425-*b*. In some examples, the PDCP layer 405 may determine a split of data between one or more UEs such that the PDCP layer 405 can maintain he amount of data allocated to both UEs operating in standalone mode of operation and UEs operating in non-standalone mode of operation. In some examples, The PDCP layer 405 may allocate the same amount of data to UEs operating in standalone mode of operation and UEs operating in non-standalone mode of operation. In some cases, the PDCP layer 405 may Implement a data split such that a sum of data allocated to RLC layer 415-*b* (e.g., LTE) and data allocated to RLC layer 415-*a* (e.g., NR) for UEs operating in non-standalone mode of operation is equal to data allocated to RLC layer 415-*a* (e.g., NR) for UEs operating in standalone mode of operation. As descried herein, the PDCP layer 405 may determine whether to adjust data allocation based on the set of data traffic parameter 425-*a* or the set of data traffic parameter 425-*b* (e.g., feedback information). In some examples, the PDCP layer 405 may iteratively adjust the data split such that a throughput associated with a standalone mode of operation is same as a throughput associated with a non-standalone mode of operation.

As described herein, the adjustment of data allocation may be based on a number of factors. In some examples, the PDCP layer 405 may determine that a congestion level, a transmission time interval utilization, a resource block utilization, a MAC scheduling rate, a number of active users, error rate or delay latency associated with the first radio access technology is higher than a previous measurement and higher than a predetermined threshold. Accordingly, for UEs operating in a non-standalone mode of operation, the PDCP layer 405 may increase an amount of data allocated to the second radio access technology and decrease an amount of data allocated to the first radio access technology. In some examples, the first radio access technology is LTE and the second radio access technology is NR. In some examples, the first radio access technology is NR and the second radio access technology is LTE Additionally or alternatively, for UEs operating in a standalone mode of operation, the PDCP layer 405 may perform a step-wise adjusting of the allocation of the first portion of data and the second portion of data such that throughput associated with a standalone mode of operation is same as a throughput associated with a non-standalone mode of operation.

In some examples, the PDCP layer 405 may determine that a congestion level, a transmission time interval utilization, a resource block utilization, a MAC scheduling rate or a number of active users, error rate or delay latency associated with the first radio access technology is less than a previous measurement and higher than a predetermined threshold. Accordingly, for UEs operating in a non-standalone mode of operation, the PDCP layer 405 may increase an amount of data allocated to the first radio access technology and decrease an amount of data allocated to the second radio access technology. In some examples, the first radio access technology is LTE and the second radio access technology is NR. In some examples, the first radio access technology is NR and the second radio access technology is LTE Additionally or alternatively, for UEs operating in a standalone mode of operation, the PDCP layer 405 may perform a step-wise adjusting of the allocation of the first portion of data and the second portion of data such that throughput associated with a standalone mode of operation is same as a throughput associated with a non-standalone mode of operation.

According to one or more aspects described herein, for UEs operating in a standalone mode of operation, the PDCP layer 405 may check data throughput for each adjustment. In particular, the PDCP layer 405 may evaluate if data throughput for a UE operating in a non-standalone mode of operation and data throughput for a UE operating in a standalone mode of operation data is according to an allowed profile (e.g., if both UEs have a balanced profile, the equal amount of data throughput is allowed). In the case where the PDCP layer 405 determines that the data throughput for the UE operating in a non-standalone mode of operation (e.g., in NR) is increased, then the PDCP layer 405 may evaluate if the UE operating in a standalone mode of operation also needs a decrease/increase in data throughput. As such, adjusting the allocation of the first portion of data and the second portion of data may include at least one of increasing the first portion of data, decreasing the first portion of data, increasing the second portion of data, decreasing the second portion of data, or a combination thereof. Implementing one or more aspects of the present disclosure may the PDCP layer 405 to maintain balance or quality of service standards in a wireless communications system.

Figure 5:
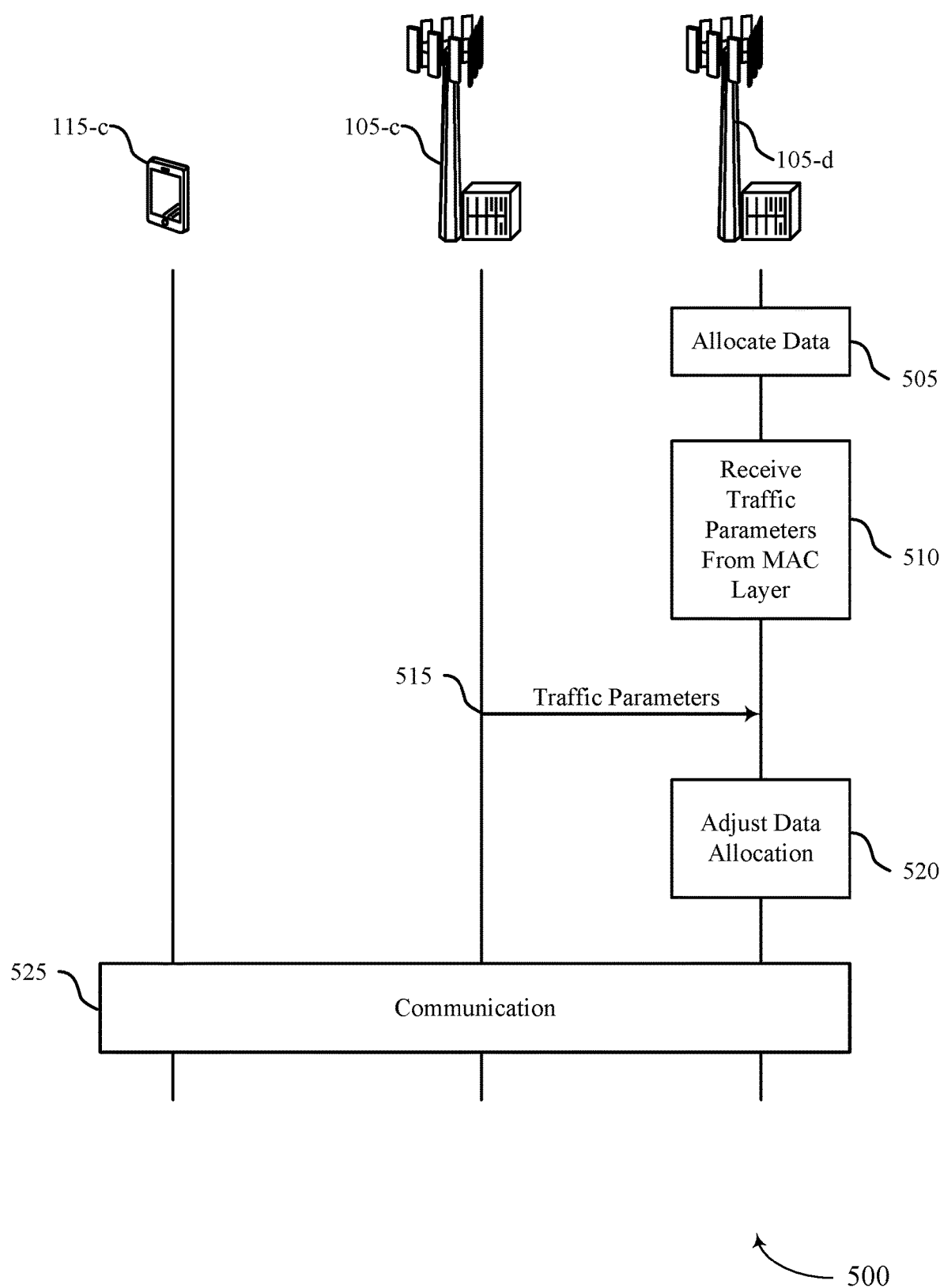
FIG. 5 illustrates an example of a process flow that supports PDCP traffic monitoring in accordance with aspects of the present disclosure.

FIG. 5 illustrates an example of a process flow 500 that supports PDCP traffic monitoring in accordance with aspects of the present disclosure. In some examples, the process flow 500 may be implemented by or may implement one or more aspects of a wireless communications system 100 or 200, a protocol stack 300, a traffic monitoring scheme 400, or any combination thereof as described with reference to FIGS. 1 through 4. The process flow 500 may include a UE 115-*c*, a base station 105-*c*, and a base station 105-*d* which may be examples of the corresponding devices as described with reference to FIG. 1. Alternative examples of the following may be implemented where some processes are performed in a different order than described or not performed at all. In some implementations, processes may include additional features not mentioned below, or further processes may be added.

At 505, a PDCP layer associated with the base station 105-*d* may allocate a first portion of data to a first radio access technology and a second portion of data to a second radio access technology. In some examples, the first radio access technology may include NR and the second radio access technology may include LTE. Additionally or alternatively, the first radio access technology and the second radio access technology may include a same radio access technology.

At 510, the PDCP layer associated with the base station 105-*d* may receive a first set of data traffic parameters from a MAC layer associated with the base station 105-*d*.

At 515, a MAC layer associated with the base station 105-*c* may report a second set of data traffic parameters to the PDCP layer associated with the base station 105-*d*. In some implementations, the first and second sets of data traffic parameters may include a traffic rate (e.g., an AMBR), a MAC scheduling availability, a congestion level, a resource block utilization, a TTI utilization, a number of active users, an error rate (e.g., a BLER), a delay latency, or any combination thereof.

At 520, the PDCP layer associated with the base station 105-*d* may adjust the data allocation based on the traffic parameters received from the MAC layers. For example, the PDCP layer may determine that one or more parameters do not satisfy a predetermined threshold. Accordingly, the PDCP layer may adjust the data allocation such that the parameters satisfy the threshold. Additionally or alternatively, the PDCP layer associated with the base station 105-*d* may adjust an allocation of data between one or more UEs 115 such that a data throughput between UEs 115 is equal. In some examples, adjusting the data allocation may include at least one of increasing the data allocation, decreasing the data allocation, or a combination thereof.

At 525, the UE 115-*c*, the base station 105-*c*, and the base station 105-*d* may communicate based on the data allocation determined by the PDCP layer associated with the base station 105-*d*. For example, the UE 115-*c* may receive a first portion of data from the base station 105-*c* and a second portion of data from the base station 105-*d*. Implementing one or more aspects of the process flow 500 may enable a wireless communications system to maintain balance or quality of service standards.

Figure 6:
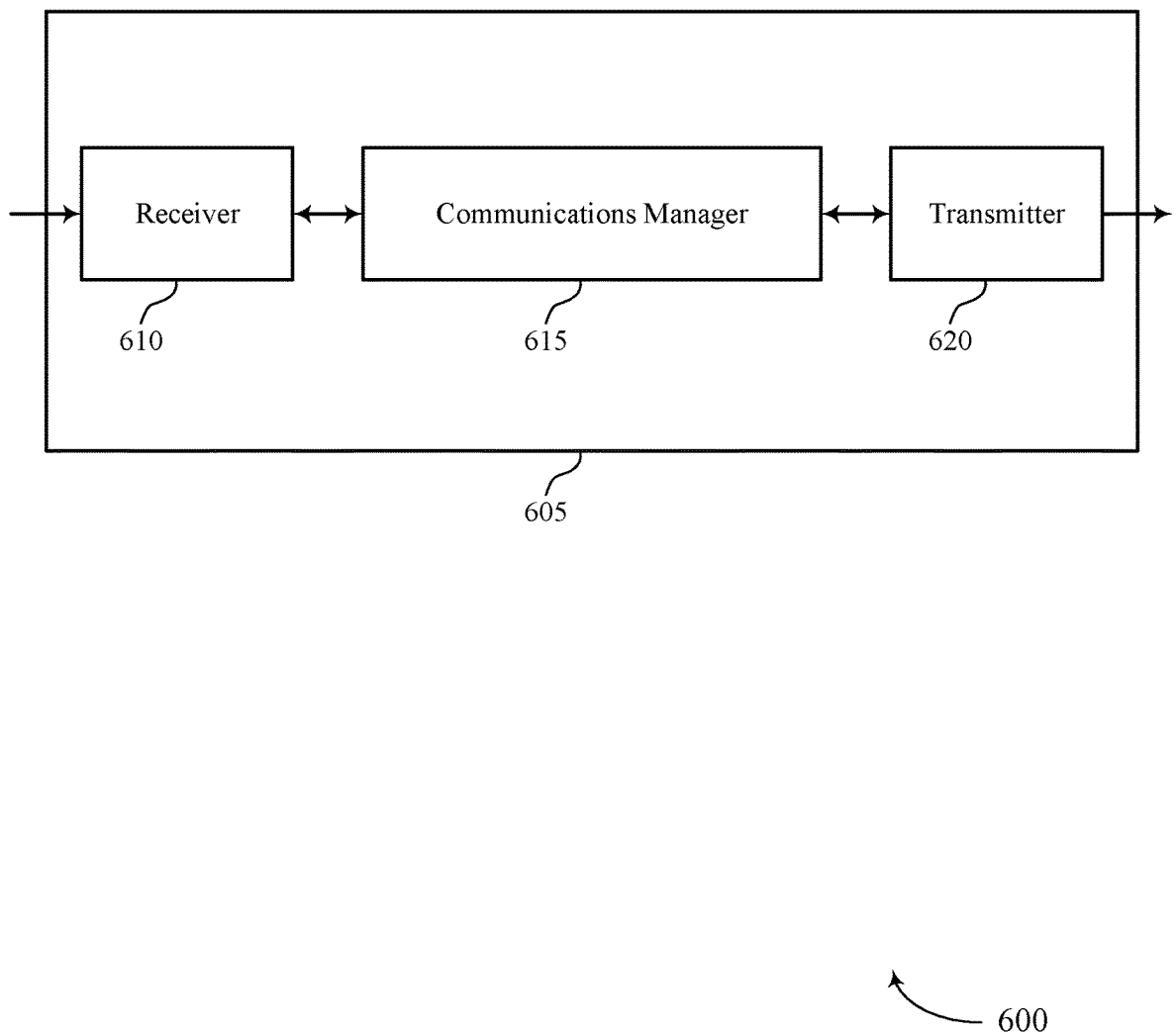
FIGS. 6 and 7 show block diagrams of devices that support PDCP traffic monitoring in accordance with aspects of the present disclosure.

FIG. 6 shows a block diagram 600 of a device 605 that supports PDCP traffic monitoring in accordance with aspects of the present disclosure. The device 605 may be an example of aspects of a base station 105 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to PDCP traffic monitoring, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may allocate a first portion of data to a first radio access technology and a second portion of data to a second radio access technology, adjust the allocation of the first portion of data and the second portion of data to allocate an adjusted first portion of data to the first radio access technology and an adjusted second portion of data to the second radio access technology based on the first set of data traffic parameters and the second set of data traffic parameters, receive, from a MAC layer at a first wireless device, a first set of data traffic parameters associated with the first radio access technology, and receive, from a MAC layer at a second wireless device, a second set of data traffic parameters associated with the second radio access technology. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
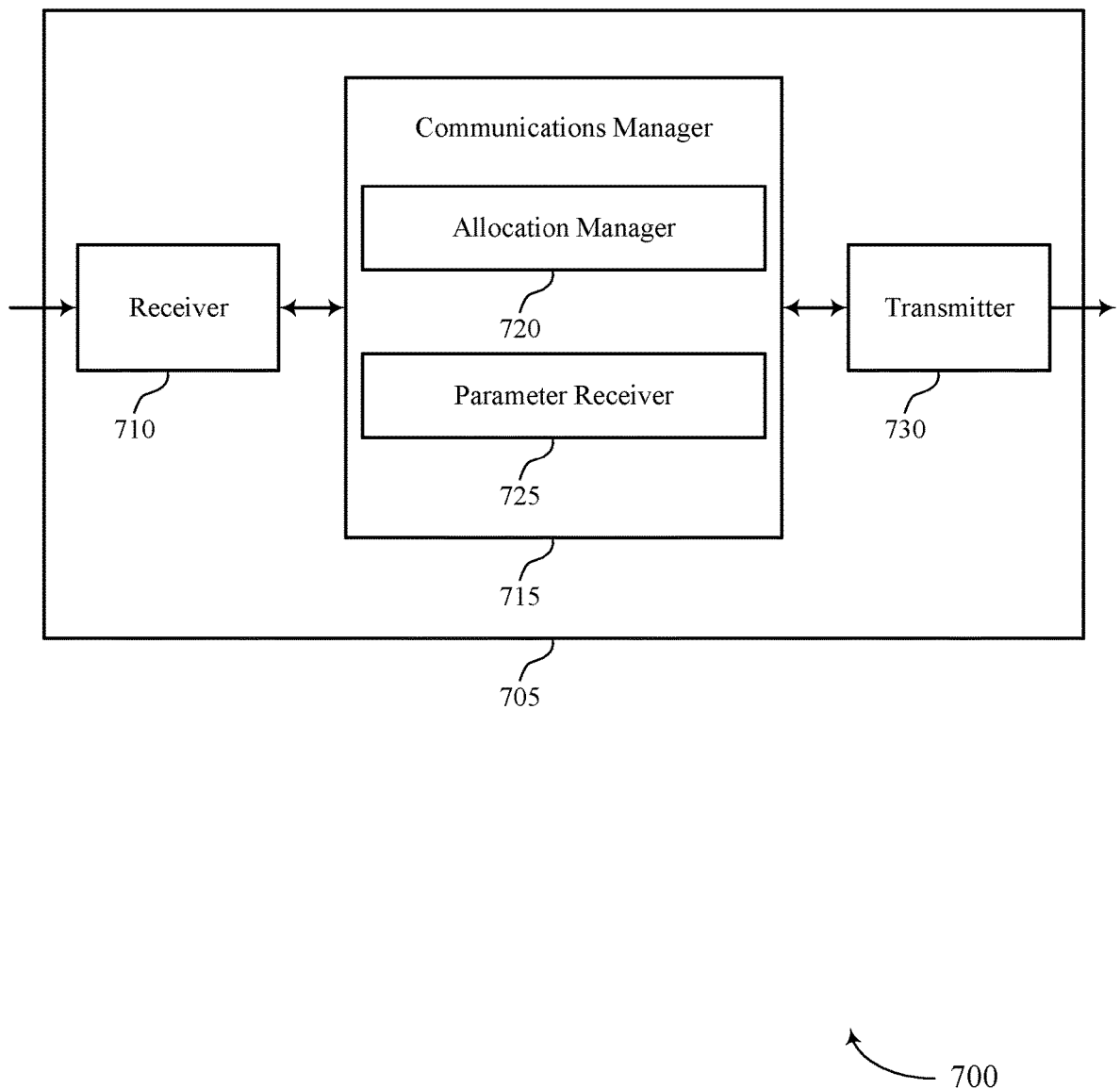

FIG. 7 shows a block diagram 700 of a device 705 that supports PDCP traffic monitoring in accordance with aspects of the present disclosure. The device 705 may be an example of aspects of a device 605, or a base station 105 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to PDCP traffic monitoring, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an allocation manager 720 and a parameter receiver 725. The communications manager 715 may be an example of aspects of the communications manager 910 described herein.

The allocation manager 720 may allocate a first portion of data to a first radio access technology and a second portion of data to a second radio access technology and adjust the allocation of the first portion of data and the second portion of data to allocate an adjusted first portion of data to the first radio access technology and an adjusted second portion of data to the second radio access technology based on the first set of data traffic parameters and the second set of data traffic parameters.

The parameter receiver 725 may receive, from a MAC layer at a first wireless device, a first set of data traffic parameters associated with the first radio access technology and receive, from a MAC layer at a second wireless device, a second set of data traffic parameters associated with the second radio access technology.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
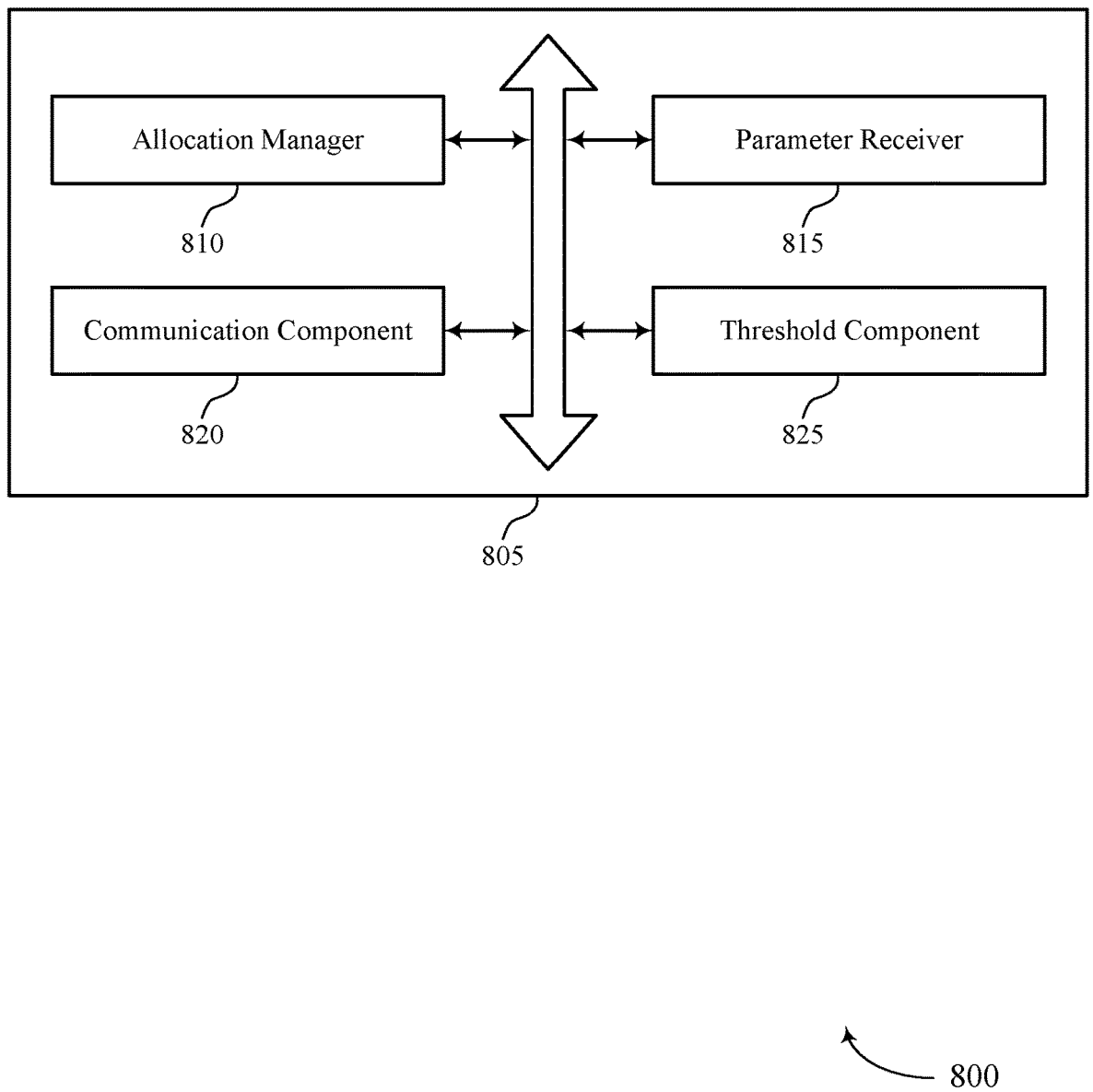
FIG. 8 shows a block diagram of a communications manager that supports PDCP traffic monitoring in accordance with aspects of the present disclosure.

FIG. 8 shows a block diagram 800 of a communications manager 805 that supports PDCP traffic monitoring in accordance with aspects of the present disclosure. The communications manager 805 may be an example of aspects of a communications manager 615, a communications manager 715, or a communications manager 910 described herein. The communications manager 805 may include an allocation manager 810, a parameter receiver 815, a communication component 820, and a threshold component 825. Each of these modules may communicate, directly or indirectly, with one another (e.g., via one or more buses).

The allocation manager 810 may allocate a first portion of data to a first radio access technology and a second portion of data to a second radio access technology.

In some examples, the allocation manager 810 may adjust the allocation of the first portion of data and the second portion of data to allocate an adjusted first portion of data to the first radio access technology and an adjusted second portion of data to the second radio access technology based on the first set of data traffic parameters and the second set of data traffic parameters.

In some examples, the allocation manager 810 may identify whether a UE associated with the first wireless device is in a standalone mode of operation or a non-standalone mode of operation based on the first set of data traffic parameters, where adjusting the allocation of the first portion of data and the second portion of data is based on the identified mode of operation.

In some examples, adjusting the allocation of the first portion of data and the second portion of data includes at least one of increasing the first portion of data, decreasing the first portion of data, increasing the second portion of data, decreasing the second portion of data, or a combination thereof. In some examples, adjusting the allocation includes a step-wise adjusting of the allocation of the first portion of data and the second portion of data. In some cases, a throughput associated with a standalone mode of operation is same as a throughput associated with a non-standalone mode of operation. In some cases, the first radio access technology includes New Radio (NR) and the second radio access technology includes LTE. In some cases, the first radio access technology and the second radio access technology include a same radio access technology.

The parameter receiver 815 may receive, from a MAC layer at a first wireless device, a first set of data traffic parameters associated with the first radio access technology. In some examples, the parameter receiver 815 may receive, from a MAC layer at a second wireless device, a second set of data traffic parameters associated with the second radio access technology.

In some examples, the parameter receiver 815 may identify a first traffic rate associated with the first radio access technology based on the first set of data traffic parameters. In some examples, the parameter receiver 815 may identify a second traffic rate associated with the second radio access technology based on the second set of data traffic parameters. In some examples, the parameter receiver 815 may identify a first scheduling availability associated with the first radio access technology based on the first set of data traffic parameters. In some examples, the parameter receiver 815 may identify a second scheduling availability associated with the second radio access technology based on the second set of data traffic parameters. In some examples, the parameter receiver 815 may identify a first congestion level associated with the first radio access technology based on the first set of data traffic parameters. In some examples, the parameter receiver 815 may identify a second congestion level associated with the second radio access technology based on the second set of data traffic parameters. In some examples, the parameter receiver 815 may identify a first resource block utilization level associated with the first radio access technology based on the first set of data traffic parameters. In some examples, the parameter receiver 815 may identify a second resource block utilization level associated with the second radio access technology based on the second set of data traffic parameters. In some examples, the parameter receiver 815 may identify a first transmission time interval utilization level associated with the first radio access technology based on the first set of data traffic parameters. In some examples, the parameter receiver 815 may identify a second transmission time interval utilization level associated with the second radio access technology based on the second set of data traffic parameters. In some examples, the parameter receiver 815 may identify a first number of active users associated with the first radio access technology based on the first set of data traffic parameters. In some examples, the parameter receiver 815 may identify a second number of active users associated with the second radio access technology based on the second set of data traffic parameters. In some examples, the parameter receiver 815 may identify a first error rate associated with the first radio access technology based on the first set of data traffic parameters. In some examples, the parameter receiver 815 may identify a second error rate associated with the second radio access technology based on the second set of data traffic parameters. In some examples, the parameter receiver 815 may identify a first delay latency associated with the first radio access technology based on the first set of data traffic parameters. In some examples, the parameter receiver 815 may identify a second delay latency associated with the second radio access technology based on the second set of data traffic parameters.

In some examples, the parameter receiver 815 may identify a data rate associated with the first radio access technology based on the first set of data traffic parameters. The communication component 820 may communicate with a first UE associated with the first radio access technology based on the adjusted first portion of data. In some examples, the communication component 820 may communicate with a second UE associated with the second radio access technology based on the adjusted second portion of data.

The threshold component 825 may determine that at least one of the first traffic rate or the second traffic rate satisfies a threshold, where adjusting the allocation of the first portion of data and the second portion of data is based on the determining. In some examples, the threshold component 825 may determine that at least one of the first scheduling availability or the second scheduling availability satisfies a threshold, where adjusting the allocation of the first portion of data and the second portion of data is based on the determining. In some examples, the threshold component 825 may determine that at least one of the first congestion level or the second congestion level does not satisfy a threshold, where adjusting the allocation of the first portion of data and the second portion of data is based on the determining. In some examples, the threshold component 825 may determine that at least one of the first resource block utilization level or the second resource block utilization level does not satisfy a threshold, where adjusting the allocation of the first portion of data and the second portion of data is based on the determining. In some examples, the threshold component 825 may determine that at least one of the first transmission time interval utilization level or the second transmission time interval utilization level does not satisfy a threshold, where adjusting the allocation of the first portion of data and the second portion of data is based on the determining. In some examples, the threshold component 825 may determine that at least one of the first number of active users or the second number of active users does not satisfy a threshold, where adjusting the allocation of the first portion of data and the second portion of data is based on the determining. In some examples, the threshold component 825 may determine that at least one of the first error rate or the second error rate does not satisfy a threshold, where adjusting the allocation of the first portion of data and the second portion of data is based on the determining. In some examples, the threshold component 825 may determine that at least one of the first delay latency or the second delay latency does not satisfy a threshold, where adjusting the allocation of the first portion of data and the second portion of data is based on the determining. In some examples, the threshold component 825 may determine that the data rate associated with the first radio access technology is less than a target data rate for the first radio access technology where adjusting the allocation of the first portion of data and the second portion of data is based on the determining.

Figure 9:
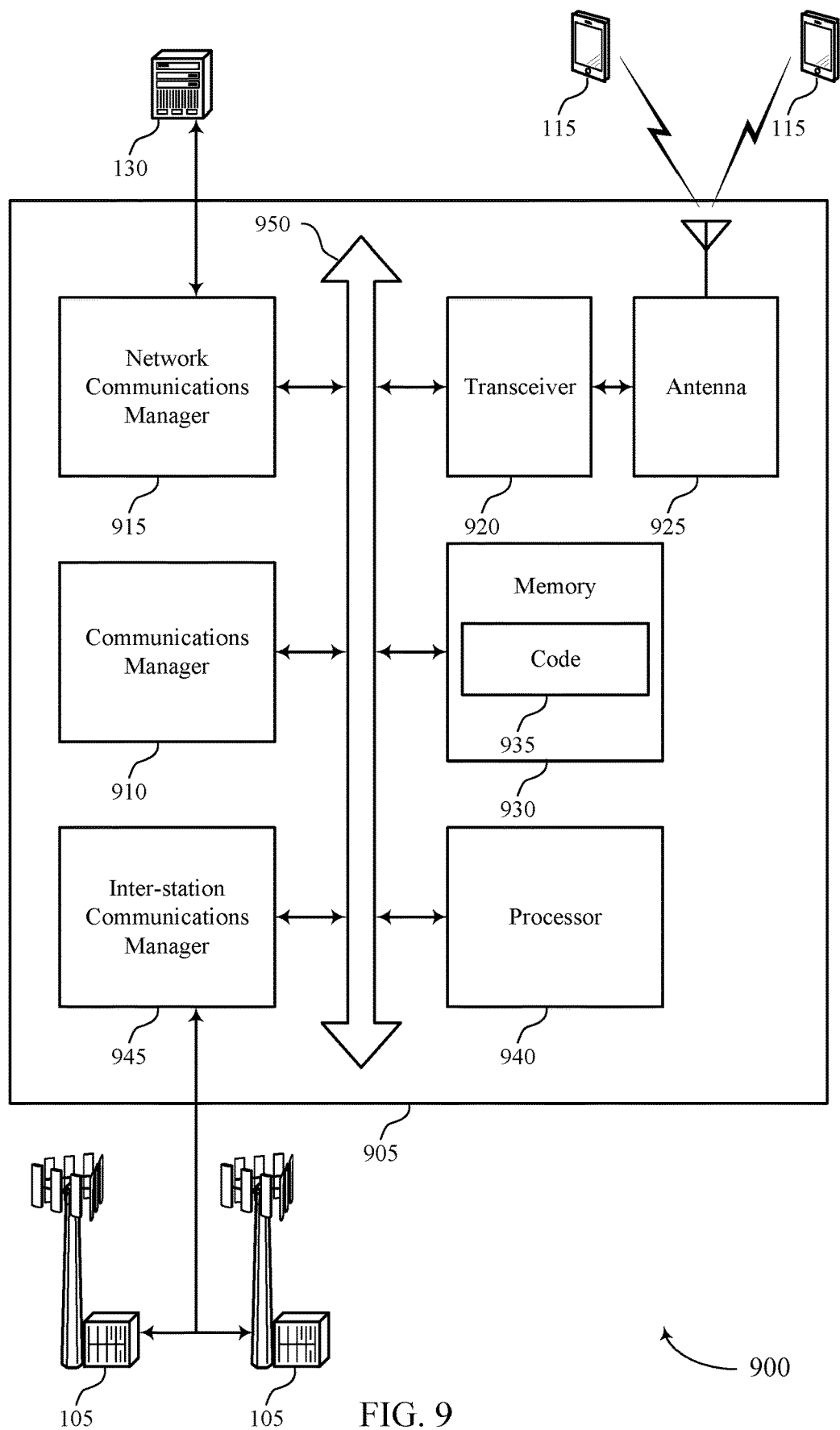
FIG. 9 shows a diagram of a system including a device that supports PDCP traffic monitoring in accordance with aspects of the present disclosure.

FIG. 9 shows a diagram of a system 900 including a device 905 that supports PDCP traffic monitoring in accordance with aspects of the present disclosure. The device 905 may be an example of or include the components of device 605, device 705, a base station 105, a core network, among other devices as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 950).

The communications manager 910 may allocate a first portion of data to a first radio access technology and a second portion of data to a second radio access technology, adjust the allocation of the first portion of data and the second portion of data to allocate an adjusted first portion of data to the first radio access technology and an adjusted second portion of data to the second radio access technology based on the first set of data traffic parameters and the second set of data traffic parameters, receive, from a MAC layer at a first wireless device, a first set of data traffic parameters associated with the first radio access technology, and receive, from a MAC layer at a second wireless device, a second set of data traffic parameters associated with the second radio access technology.

The network communications manager 915 may manage communications with the core network (e.g., via one or more wired backhaul links). For example, the network communications manager 915 may manage the transfer of data communications for client devices, such as one or more UEs 115.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some cases, a memory controller may be integrated into processor 940. The processor 940 may be configured to execute computer-readable instructions stored in a memory (e.g., the memory 930) to cause the device 905 to perform various functions (e.g., functions or tasks supporting PDCP traffic monitoring).

The inter-station communications manager 945 may manage communications with other base station 105 and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
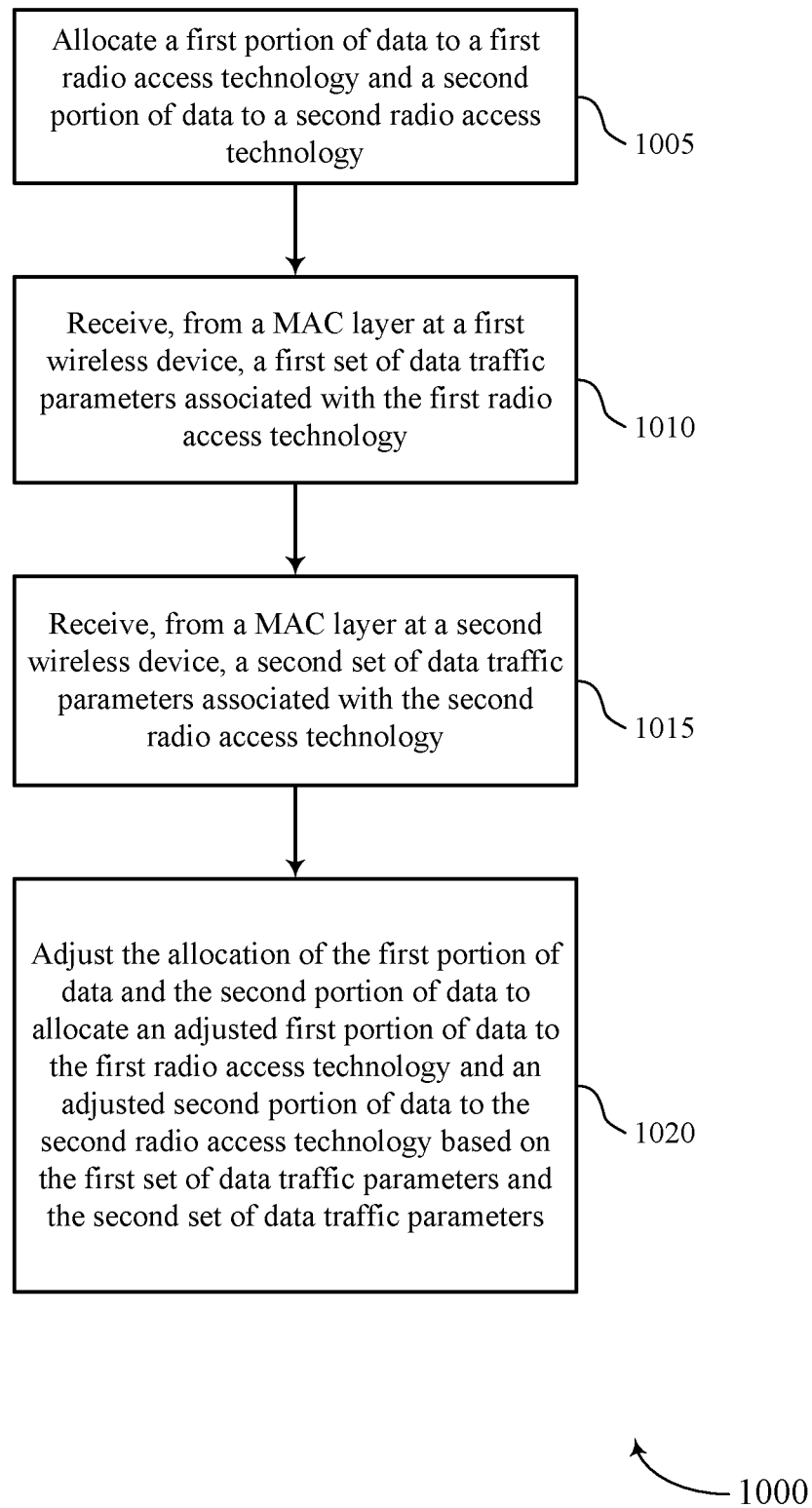
FIGS. 10 through 12 show flowcharts illustrating methods that support PDCP traffic monitoring in accordance with aspects of the present disclosure.

FIG. 10 shows a flowchart illustrating a method 1000 that supports PDCP traffic monitoring in accordance with aspects of the present disclosure. The operations of method 1000 may be implemented by a base station 105 or its components as described herein. For example, the operations of method 1000 may be performed by a communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 1005, the base station may allocate a first portion of data to a first radio access technology and a second portion of data to a second radio access technology. The operations of 1005 may be performed according to the methods described herein. In some examples, aspects of the operations of 1005 may be performed by an allocation manager as described with reference to FIGS. 6 through 9.

At 1010, the base station may receive, from a MAC layer at a first wireless device, a first set of data traffic parameters associated with the first radio access technology. The operations of 1010 may be performed according to the methods described herein. In some examples, aspects of the operations of 1010 may be performed by a parameter receiver as described with reference to FIGS. 6 through 9.

At 1015, the base station may receive, from a MAC layer at a second wireless device, a second set of data traffic parameters associated with the second radio access technology. The operations of 1015 may be performed according to the methods described herein. In some examples, aspects of the operations of 1015 may be performed by a parameter receiver as described with reference to FIGS. 6 through 9.

At 1020, the base station may adjust the allocation of the first portion of data and the second portion of data to allocate an adjusted first portion of data to the first radio access technology and an adjusted second portion of data to the second radio access technology based on the first set of data traffic parameters and the second set of data traffic parameters. The operations of 1020 may be performed according to the methods described herein. In some examples, aspects of the operations of 1020 may be performed by an allocation manager as described with reference to FIGS. 6 through 9.

Figure 11:
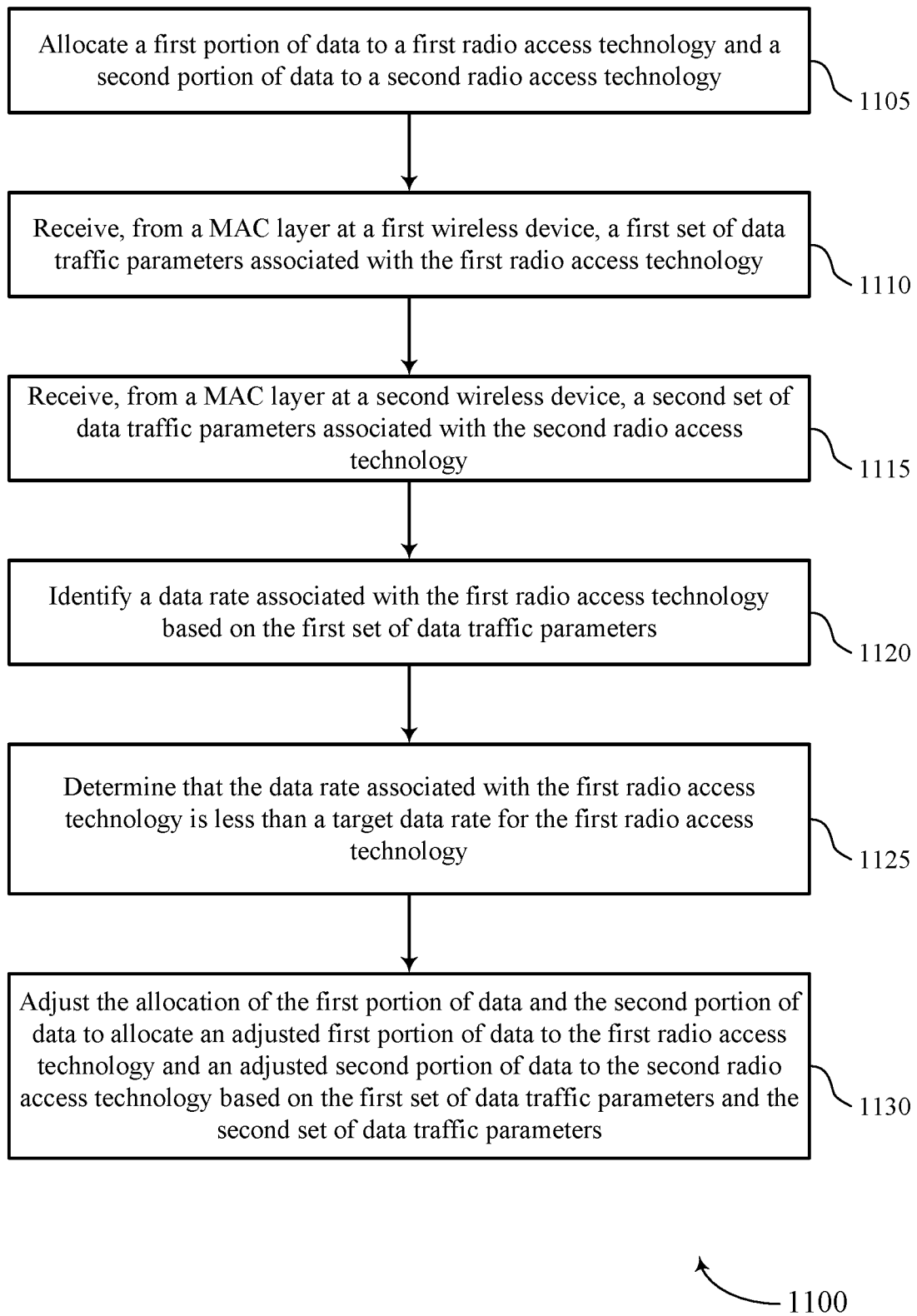

FIG. 11 shows a flowchart illustrating a method 1100 that supports PDCP traffic monitoring in accordance with aspects of the present disclosure. The operations of method 1100 may be implemented by a base station 105 or its components as described herein. For example, the operations of method 1100 may be performed by a communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 1105, the base station may allocate a first portion of data to a first radio access technology and a second portion of data to a second radio access technology. The operations of 1105 may be performed according to the methods described herein. In some examples, aspects of the operations of 1105 may be performed by an allocation manager as described with reference to FIGS. 6 through 9.

At 1110, the base station may receive, from a MAC layer at a first wireless device, a first set of data traffic parameters associated with the first radio access technology. The operations of 1110 may be performed according to the methods described herein. In some examples, aspects of the operations of 1110 may be performed by a parameter receiver as described with reference to FIGS. 6 through 9.

At 1115, the base station may receive, from a MAC layer at a second wireless device, a second set of data traffic parameters associated with the second radio access technology. The operations of 1115 may be performed according to the methods described herein. In some examples, aspects of the operations of 1115 may be performed by a parameter receiver as described with reference to FIGS. 6 through 9.

At 1120, the base station may identify a data rate associated with the first radio access technology based on the first set of data traffic parameters. The operations of 1120 may be performed according to the methods described herein. In some examples, aspects of the operations of 1120 may be performed by a parameter receiver as described with reference to FIGS. 6 through 9.

At 1125, the base station may determine that the data rate associated with the first radio access technology is less than a target data rate for the first radio access technology. The operations of 1125 may be performed according to the methods described herein. In some examples, aspects of the operations of 1125 may be performed by a threshold component as described with reference to FIGS. 6 through 9.

At 1130, the base station may adjust the allocation of the first portion of data and the second portion of data to allocate an adjusted first portion of data to the first radio access technology and an adjusted second portion of data to the second radio access technology based on the first set of data traffic parameters and the second set of data traffic parameters. The operations of 1130 may be performed according to the methods described herein. In some examples, aspects of the operations of 1130 may be performed by an allocation manager as described with reference to FIGS. 6 through 9.

Figure 12:
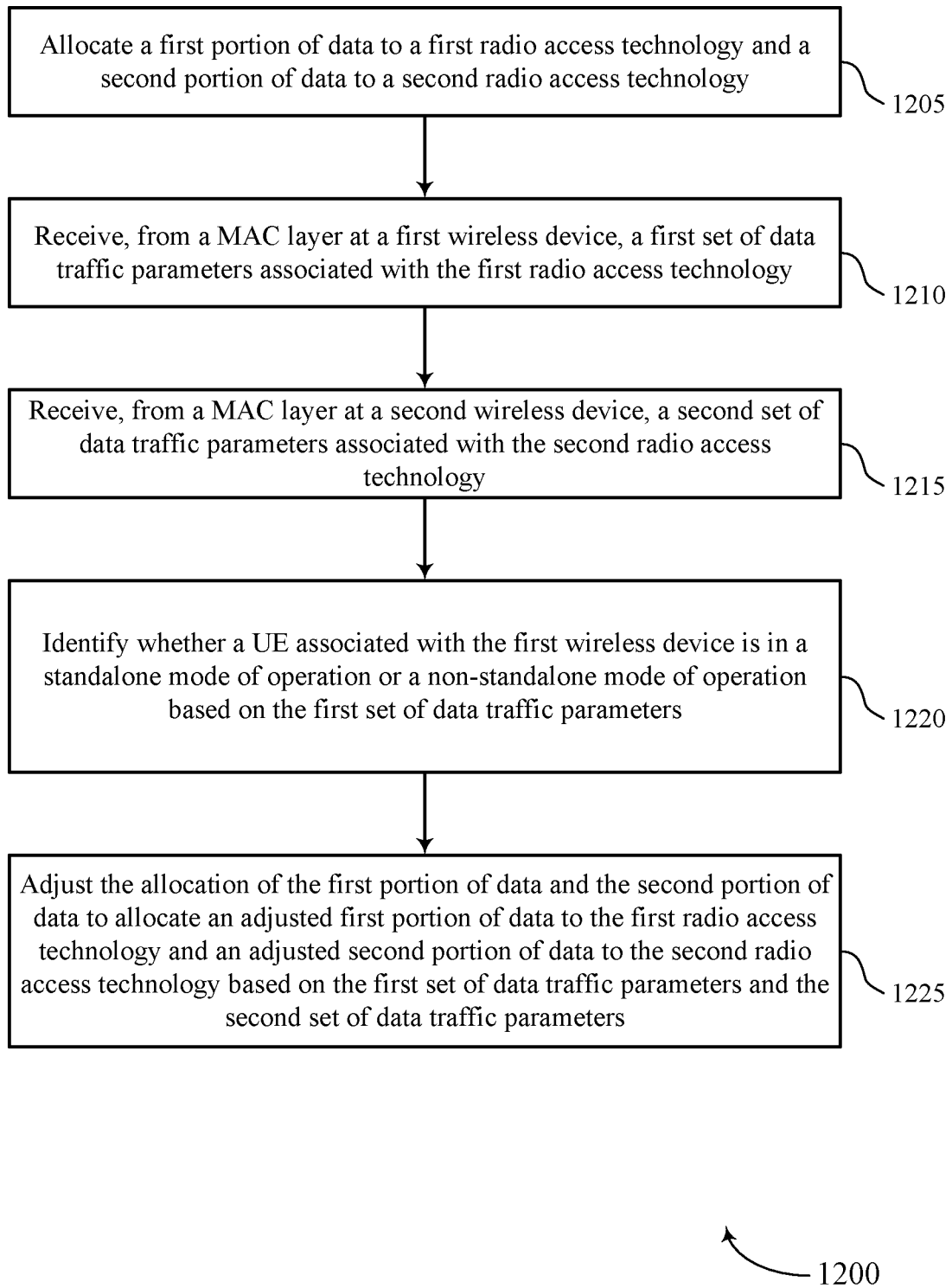

FIG. 12 shows a flowchart illustrating a method 1200 that supports PDCP traffic monitoring in accordance with aspects of the present disclosure. The operations of method 1200 may be implemented by a base station 105 or its components as described herein. For example, the operations of method 1200 may be performed by a communications manager as described with reference to FIGS. 6 through 9. In some examples, a base station may execute a set of instructions to control the functional elements of the base station to perform the functions described herein. Additionally or alternatively, a base station may perform aspects of the functions described herein using special-purpose hardware.

At 1205, the base station may allocate a first portion of data to a first radio access technology and a second portion of data to a second radio access technology. The operations of 1205 may be performed according to the methods described herein. In some examples, aspects of the operations of 1205 may be performed by an allocation manager as described with reference to FIGS. 6 through 9.

At 1210, the base station may receive, from a MAC layer at a first wireless device, a first set of data traffic parameters associated with the first radio access technology. The operations of 1210 may be performed according to the methods described herein. In some examples, aspects of the operations of 1210 may be performed by a parameter receiver as described with reference to FIGS. 6 through 9.

At 1215, the base station may receive, from a MAC layer at a second wireless device, a second set of data traffic parameters associated with the second radio access technology. The operations of 1215 may be performed according to the methods described herein. In some examples, aspects of the operations of 1215 may be performed by a parameter receiver as described with reference to FIGS. 6 through 9.

At 1220, the base station may identify whether a UE associated with the first wireless device is in a standalone mode of operation or a non-standalone mode of operation based on the first set of data traffic parameters. The operations of 1220 may be performed according to the methods described herein. In some examples, aspects of the operations of 1220 may be performed by an allocation manager as described with reference to FIGS. 6 through 9.

At 1225, the base station may adjust the allocation of the first portion of data and the second portion of data to allocate an adjusted first portion of data to the first radio access technology and an adjusted second portion of data to the second radio access technology based on the first set of data traffic parameters and the second set of data traffic parameters. The operations of 1225 may be performed according to the methods described herein. In some examples, aspects of the operations of 1225 may be performed by an allocation manager as described with reference to FIGS. 6 through 9.

It should be noted that the methods described herein describe possible implementations, and that the operations and the features may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:

allocating a first portion of data to a first radio access technology and a second portion of data to a second radio access technology;
receiving, from a medium access control layer at the first wireless device, a first set of data traffic parameters associated with the first radio access technology;
receiving, from a medium access control layer at a second wireless device, a second set of data traffic parameters associated with the second radio access technology; and
adjusting the allocation of the first portion of data and the second portion of data to allocate an adjusted first portion of data to the first radio access technology and an adjusted second portion of data to the second radio access technology based at least in part on the first set of data traffic parameters and the second set of data traffic parameters.

2. The method of claim 1, further comprising:
communicating with a first user equipment associated with the first radio access technology based at least in part on the adjusted first portion of data; and
communicating with a second user equipment associated with the second radio access technology based at least in part on the adjusted second portion of data.

3. The method of claim 1, further comprising:
identifying a first traffic rate associated with the first radio access technology based at least in part on the first set of data traffic parameters;
identifying a second traffic rate associated with the second radio access technology based at least in part on the second set of data traffic parameters; and
determining that at least one of the first traffic rate or the second traffic rate satisfies a threshold, wherein adjusting the allocation of the first portion of data and the second portion of data is based at least in part on the determining.

4. The method of claim 1, further comprising:
identifying a first scheduling availability associated with the first radio access technology based at least in part on the first set of data traffic parameters;
identifying a second scheduling availability associated with the second radio access technology based at least in part on the second set of data traffic parameters; and
determining that at least one of the first scheduling availability or the second scheduling availability satisfies a threshold, wherein adjusting the allocation of the first portion of data and the second portion of data is based at least in part on the determining.

5. The method of claim 1, further comprising:
identifying a first congestion level associated with the first radio access technology based at least in part on the first set of data traffic parameters;
identifying a second congestion level associated with the second radio access technology based at least in part on the second set of data traffic parameters; and
determining that at least one of the first congestion level or the second congestion level does not satisfy a threshold, wherein adjusting the allocation of the first portion of data and the second portion of data is based at least in part on the determining.

6. The method of claim 1, further comprising:
identifying a first resource block utilization level associated with the first radio access technology based at least in part on the first set of data traffic parameters;

identifying a second resource block utilization level associated with the second radio access technology based at least in part on the second set of data traffic parameters; and determining that at least one of the first resource block utilization level or the second resource block utilization level does not satisfy a threshold, wherein adjusting the allocation of the first portion of data and the second portion of data is based at least in part on the determining.

7. The method of claim 1, further comprising:

identifying a first transmission time interval utilization level associated with the first radio access technology based at least in part on the first set of data traffic parameters;

identifying a second transmission time interval utilization level associated with the second radio access technology based at least in part on the second set of data traffic parameters; and determining that at least one of the first transmission time interval utilization level or the second transmission time interval utilization level does not satisfy a threshold, wherein adjusting the allocation of the first portion of data and the second portion of data is based at least in part on the determining.

8. The method of claim 1, further comprising:

identifying a first number of active users associated with the first radio access technology based at least in part on the first set of data traffic parameters;

identifying a second number of active users associated with the second radio access technology based at least in part on the second set of data traffic parameters; and determining that at least one of the first number of active users or the second number of active users does not satisfy a threshold, wherein adjusting the allocation of the first portion of data and the second portion of data is based at least in part on the determining.

9. The method of claim 1, further comprising:

identifying a first error rate associated with the first radio access technology based at least in part on the first set of data traffic parameters;

identifying a second error rate associated with the second radio access technology based at least in part on the second set of data traffic parameters; and determining that at least one of the first error rate or the second error rate does not satisfy a threshold, wherein adjusting the allocation of the first portion of data and the second portion of data is based at least in part on the determining.

10. The method of claim 1, further comprising:

identifying a first delay latency associated with the first radio access technology based at least in part on the first set of data traffic parameters;

identifying a second delay latency associated with the second radio access technology based at least in part on the second set of data traffic parameters; and determining that at least one of the first delay latency or the second delay latency does not satisfy a threshold, wherein adjusting the allocation of the first portion of data and the second portion of data is based at least in part on the determining.

11. The method of claim 1, further comprising:

identifying a data rate associated with the first radio access technology based at least in part on the first set of data traffic parameters; and determining that the data rate associated with the first radio access technology is less than a target data rate for the first radio access technology wherein adjusting the allocation of the first portion of data and the second portion of data is based at least in part on the determining.

12. The method of claim 1, further comprising:

identifying whether a user equipment associated with the first wireless device is in a standalone mode of operation or a non-standalone mode of operation based at least in part on the first set of data traffic parameters, wherein adjusting the allocation of the first portion of data and the second portion of data is based at least in part on the identified mode of operation.

13. The method of claim 12, wherein a throughput associated with a standalone mode of operation is same as a throughput associated with a non-standalone mode of operation.

14. The method of claim 1, wherein:

adjusting the allocation of the first portion of data and the second portion of data comprises at least one of increasing the first portion of data, decreasing the first portion of data, increasing the second portion of data, decreasing the second portion of data, or a combination thereof.

15. The method of claim 1, wherein:

adjusting the allocation comprises a step-wise adjusting of the allocation of the first portion of data and the second portion of data.

16. The method of claim 1, wherein the first radio access technology comprises New Radio (NR) and the second radio access technology comprises Long Term Evolution (LTE).

17. The method of claim 1, wherein the first radio access technology and the second radio access technology comprise a same radio access technology.

18. An apparatus for wireless communications at a first wireless device, comprising:

a processor, memory coupled to the processor; and instructions stored in the memory and executable by the processor to cause the apparatus to:

allocate a first portion of data to a first radio access technology and a second portion of data to a second radio access technology;

receive, from a medium access control layer at the first wireless device, a first set of data traffic parameters associated with the first radio access technology;

receive, from a medium access control layer at a second wireless device, a second set of data traffic parameters associated with the second radio access technology; and adjust the allocation of the first portion of data and the second portion of data to allocate an adjusted first portion of data to the first radio access technology and an adjusted second portion of data to the second radio access technology based at least in part on the first set of data traffic parameters and the second set of data traffic parameters.

19. The apparatus of claim 18, wherein the instructions are further executable by the processor to cause the apparatus to:

identify a first traffic rate associated with the first radio access technology based at least in part on the first set of data traffic parameters;

identify a second traffic rate associated with the second radio access technology based at least in part on the second set of data traffic parameters; and determine that at least one of the first traffic rate or the second traffic rate satisfies a threshold, wherein adjusting the allocation of the first portion of data and the second portion of data is based at least in part on the determining.

20. The apparatus of claim 18, wherein the instructions are further executable by the processor to cause the apparatus to:
identify a first scheduling availability associated with the first radio access technology based at least in part on the first set of data traffic parameters;
identify a second scheduling availability associated with the second radio access technology based at least in part on the second set of data traffic parameters; and
determine that at least one of the first scheduling availability or the second scheduling availability satisfies a threshold, wherein adjusting the allocation of the first portion of data and the second portion of data is based at least in part on the determining.

21. The apparatus of claim 18, wherein the instructions are further executable by the processor to cause the apparatus to:
identify a first congestion level associated with the first radio access technology based at least in part on the first set of data traffic parameters;
identify a second congestion level associated with the second radio access technology based at least in part on the second set of data traffic parameters; and
determine that at least one of the first congestion level or the second congestion level does not satisfy a threshold, wherein adjusting the allocation of the first portion of data and the second portion of data is based at least in part on the determining.

22. The apparatus of claim 18, wherein the instructions are further executable by the processor to cause the apparatus to:
identify a first resource block utilization level associated with the first radio access technology based at least in part on the first set of data traffic parameters;
identify a second resource block utilization level associated with the second radio access technology based at least in part on the second set of data traffic parameters; and
determine that at least one of the first resource block utilization level or the second resource block utilization level does not satisfy a threshold, wherein adjusting the allocation of the first portion of data and the second portion of data is based at least in part on the determining.

23. The apparatus of claim 18, wherein the instructions are further executable by the processor to cause the apparatus to:
identify a first transmission time interval utilization level associated with the first radio access technology based at least in part on the first set of data traffic parameters;
identify a second transmission time interval utilization level associated with the second radio access technology based at least in part on the second set of data traffic parameters; and
determine that at least one of the first transmission time interval utilization level or the second transmission time interval utilization level does not satisfy a threshold, wherein adjusting the allocation of the first portion of data and the second portion of data is based at least in part on the determining.

24. The apparatus of claim 18, wherein the instructions are further executable by the processor to cause the apparatus to:
identify a first number of active users associated with the first radio access technology based at least in part on the first set of data traffic parameters;
identify a second number of active users associated with the second radio access technology based at least in part on the second set of data traffic parameters; and
determine that at least one of the first number of active users or the second number of active users does not satisfy a threshold, wherein adjusting the allocation of the first portion of data and the second portion of data is based at least in part on the determining.

25. The apparatus of claim 18, wherein the instructions are further executable by the processor to cause the apparatus to:
identify a first error rate associated with the first radio access technology based at least in part on the first set of data traffic parameters;
identify a second error rate associated with the second radio access technology based at least in part on the second set of data traffic parameters; and
determine that at least one of the first error rate or the second error rate does not satisfy a threshold, wherein adjusting the allocation of the first portion of data and the second portion of data is based at least in part on the determining.

26. The apparatus of claim 18, wherein the instructions are further executable by the processor to cause the apparatus to:
identify a first delay latency associated with the first radio access technology based at least in part on the first set of data traffic parameters;
identify a second delay latency associated with the second radio access technology based at least in part on the second set of data traffic parameters; and
determine that at least one of the first delay latency or the second delay latency does not satisfy a threshold, wherein adjusting the allocation of the first portion of data and the second portion of data is based at least in part on the determining.

27. The apparatus of claim 18, wherein the instructions are further executable by the processor to cause the apparatus to:
identify a data rate associated with the first radio access technology based at least in part on the first set of data traffic parameters; and
determine that the data rate associated with the first radio access technology is less than a target data rate for the first radio access technology wherein adjusting the allocation of the first portion of data and the second portion of data is based at least in part on the determining.

28. The apparatus of claim 18, wherein the instructions are further executable by the processor to cause the apparatus to:
identify whether a user equipment associated with the first wireless device is in a standalone mode of operation or a non-standalone mode of operation based at least in part on the first set of data traffic parameters, wherein adjusting the allocation of the first portion of data and the second portion of data is based at least in part on the identified mode of operation.

29. An apparatus for wireless communications at a first wireless device, comprising:
means for allocating a first portion of data to a first radio access technology and a second portion of data to a second radio access technology;

means for receiving, from a medium access control layer at the first wireless device, a first set of data traffic parameters associated with the first radio access technology;

means for receiving, from a medium access control layer at a second wireless device, a second set of data traffic parameters associated with the second radio access technology; and means for adjusting the allocation of the first portion of data and the second portion of data to allocate an adjusted first portion of data to the first radio access technology and an adjusted second portion of data to the second radio access technology based at least in part on the first set of data traffic parameters and the second set of data traffic parameters.

30. A non-transitory computer-readable medium storing code for wireless communications at a first wireless device, the code comprising instructions executable by a processor to:

allocate a first portion of data to a first radio access technology and a second portion of data to a second radio access technology;

receive, from a medium access control layer at the first wireless device, a first set of data traffic parameters associated with the first radio access technology;

receive, from a medium access control layer at a second wireless device, a second set of data traffic parameters associated with the second radio access technology; and adjust the allocation of the first portion of data and the second portion of data to allocate an adjusted first portion of data to the first radio access technology and an adjusted second portion of data to the second radio access technology based at least in part on the first set of data traffic parameters and the second set of data traffic parameters.

* * * * *